US009691154B2

(12) United States Patent
Ernst et al.

(10) Patent No.: US 9,691,154 B2
(45) Date of Patent: Jun. 27, 2017

(54) DIGITAL OPTICAL INSTRUMENT HAVING A FOLDING BRIDGE

(71) Applicant: Carl Zeiss Sports Optics GmbH, Wetzlar (DE)

(72) Inventors: Michael Ernst, Sinn (DE); Steffen Teroerde, Marburg (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 0 days.

(21) Appl. No.: 14/757,442

(22) Filed: Dec. 23, 2015

(65) Prior Publication Data
US 2016/0180534 A1   Jun. 23, 2016

(30) Foreign Application Priority Data

Dec. 23, 2014 (DE) .................. 10 2014 119 580

(51) Int. Cl.
G02B 23/00 (2006.01)
G06T 7/00 (2017.01)
G02B 23/12 (2006.01)
G02B 23/18 (2006.01)
G02B 23/24 (2006.01)
G02B 25/00 (2006.01)
G06K 9/32 (2006.01)
(Continued)

(52) U.S. Cl.
CPC .............. *G06T 7/0044* (2013.01); *G02B 7/12* (2013.01); *G02B 23/12* (2013.01); *G02B 23/18* (2013.01); *G02B 23/2484* (2013.01); *G02B 25/004* (2013.01); *G06K 9/3208* (2013.01); *H04N 5/2252* (2013.01); *H04N 5/23293* (2013.01); *H04N 5/2628* (2013.01)

(58) Field of Classification Search
None
See application file for complete search history.

(56) References Cited

U.S. PATENT DOCUMENTS 5,579,026 A   11/1996 Tabata
5,963,369 A   10/1999 Steinthal et al.
(Continued)

FOREIGN PATENT DOCUMENTS

JP   11-64740 A   3/1999
JP   11-112851 A   4/1999
(Continued)

*Primary Examiner* — Twyler Haskins
*Assistant Examiner* — Dwight C Tejano
(74) *Attorney, Agent, or Firm* — Walter Ottesen, P.A.

(57) ABSTRACT

The invention relates to a digital optical instrument including two eyepieces and a folding bridge for adapting the eyepiece distance to the interpupillary distance of the user. In an image recorded by an image sensor, a first bounding frame which is tilted about a first tilt angle relative to the image sensor, is defined and bounds a first portion of the recorded image, wherein the first tilt angle is defined depending on the folding angle. The first portion which is bounded by the tilted first bounding frame is transmitted to the first or second display and displayed by the first or the second mechanically tilted display while maintaining the orientation of the recorded image relative to the observed scene or relative to the horizontal, that is, without rotating the recorded image or the image portion relative to the observed scene or relative to the horizontal.

16 Claims, 12 Drawing Sheets

(51) Int. Cl.
  *H04N 5/225*   (2006.01)
  *H04N 5/232*   (2006.01)
  *H04N 5/262*   (2006.01)
  *G02B 7/12*   (2006.01)

(56) References Cited

U.S. PATENT DOCUMENTS

| | | |
|---|---|---|
| 7,164,528 B2 | 1/2007 | Mogamiya |
| 7,202,999 B2 | 4/2007 | Mogamiya |
| 7,312,923 B2 | 12/2007 | Yamauchi et al. |
| 2002/0109785 A1* | 8/2002 | Hammack .............. G02B 23/18 348/376 |
| 2004/0257648 A1* | 12/2004 | Mogamiya ............. G02B 23/18 359/407 |
| 2006/0098277 A1* | 5/2006 | Huang .................... G02B 7/06 359/409 |
| 2006/0193039 A1* | 8/2006 | Yamauchi ............ H04N 5/2253 359/407 |
| 2007/0053056 A1 | 3/2007 | Charlesworth |
| 2012/0257284 A1 | 10/2012 | Okamoto |
| 2013/0194666 A1 | 8/2013 | Teroerde et al. |
| 2015/0002938 A1 | 1/2015 | Bach |
| 2015/0054936 A1 | 2/2015 | Bach et al. |

FOREIGN PATENT DOCUMENTS

| | | |
|---|---|---|
| JP | 2004-191861 A | 7/2004 |
| WO | 9906870 | 2/1999 |

* cited by examiner

Fig. 4
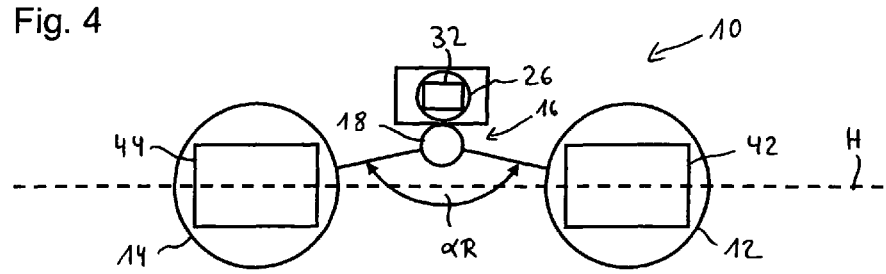
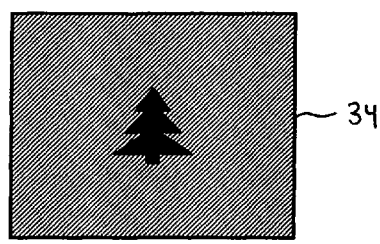
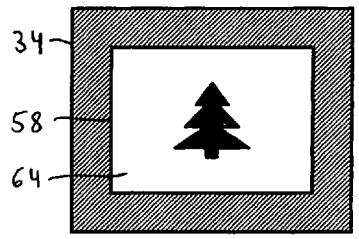 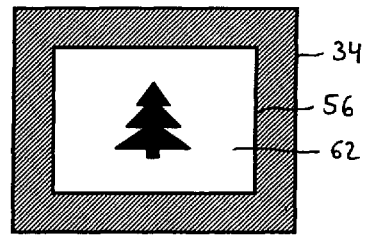
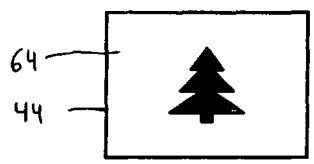 
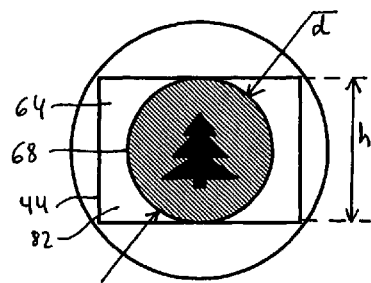 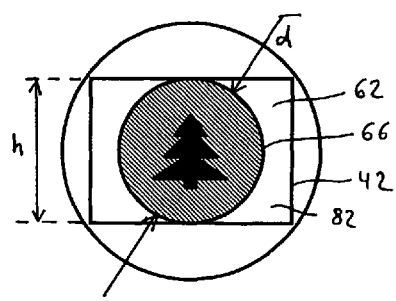

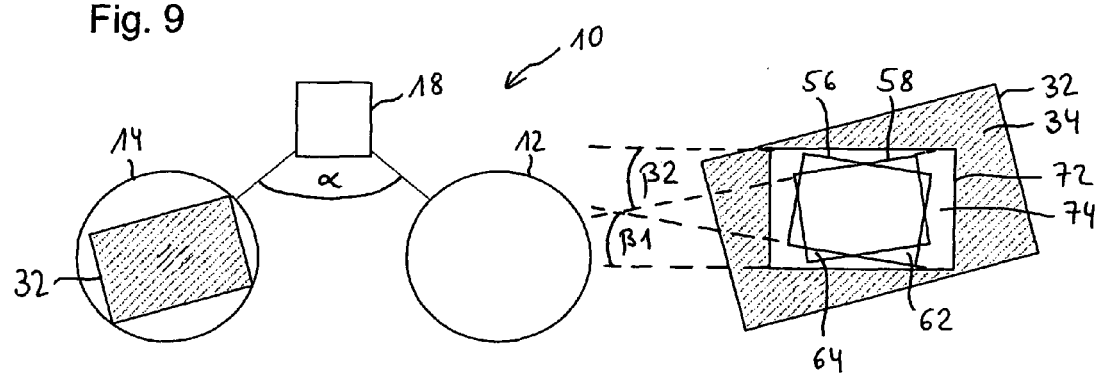
Fig. 9
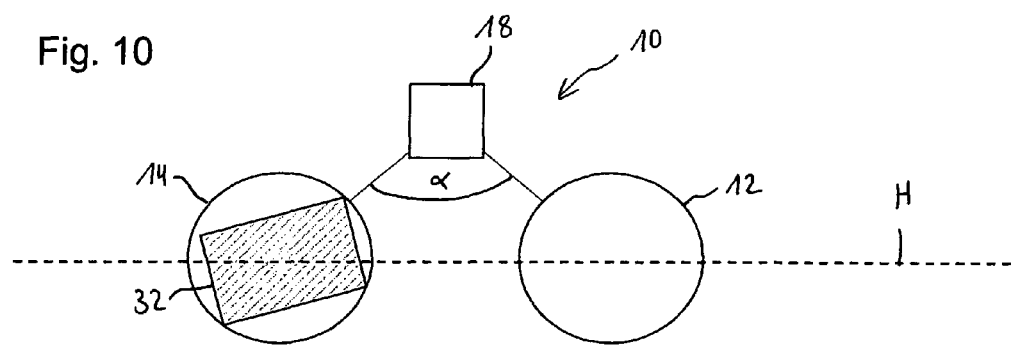
Fig. 10
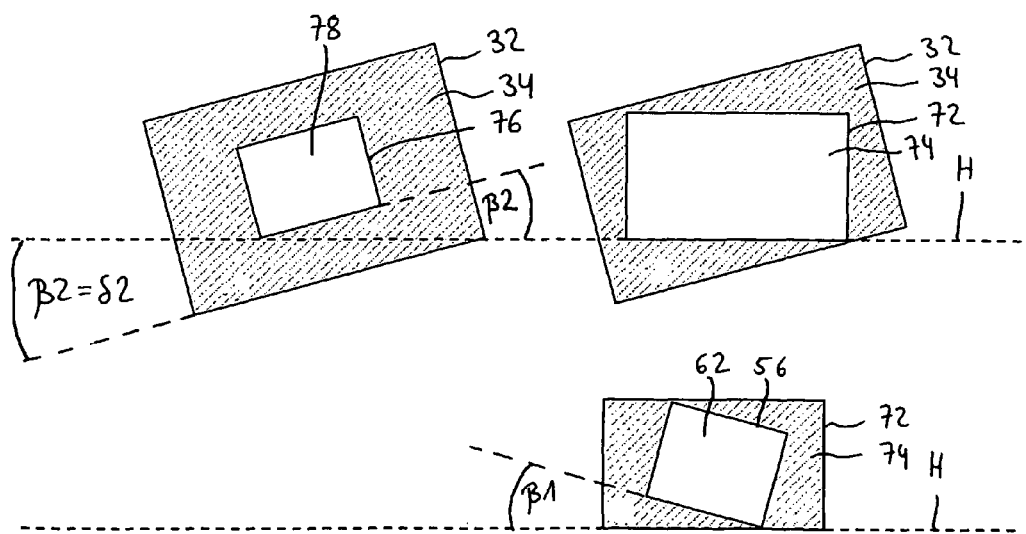

Fig. 11
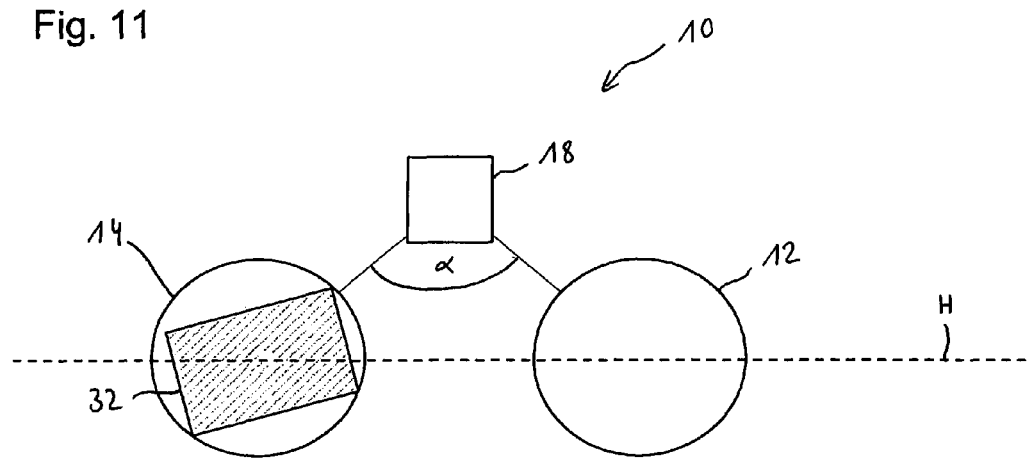
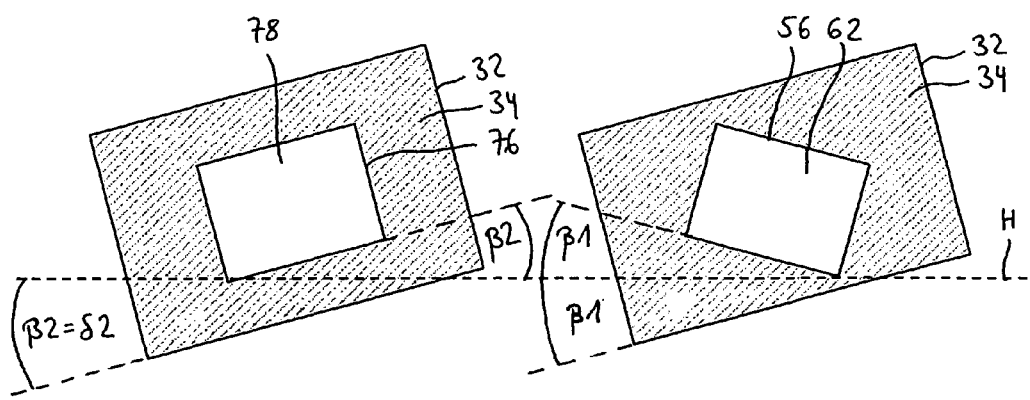

Fig. 12
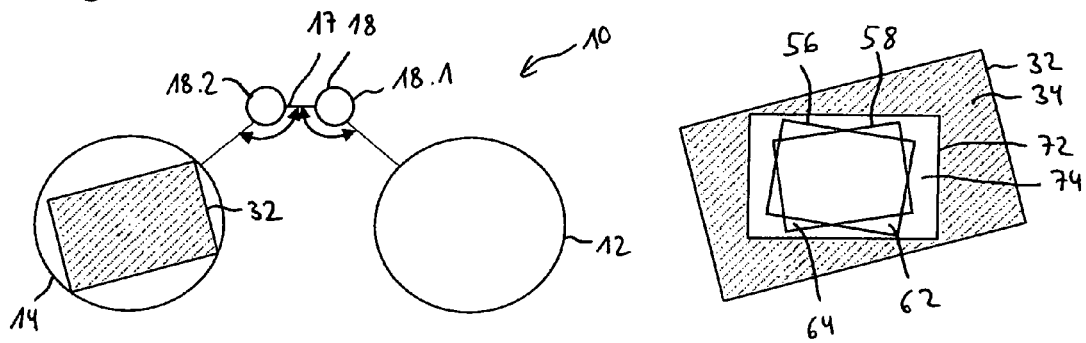
Fig. 13
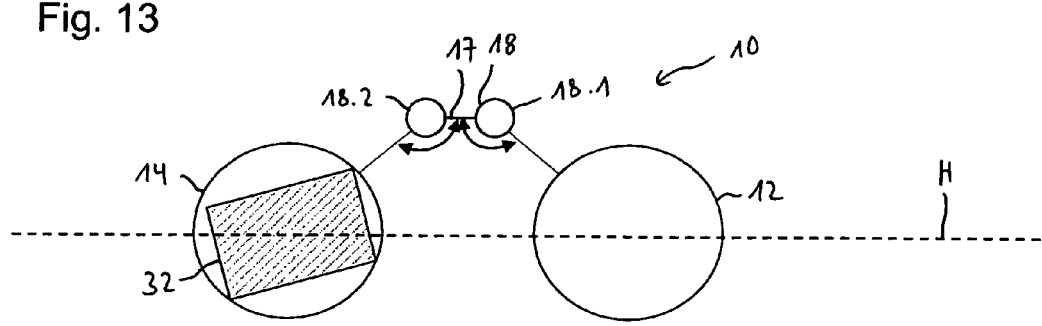
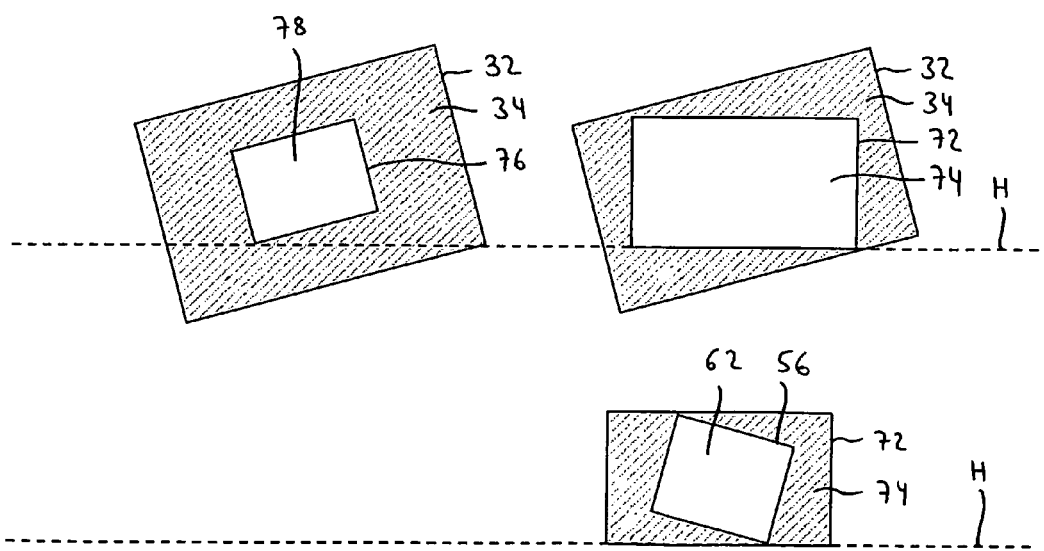

DIGITAL OPTICAL INSTRUMENT HAVING A FOLDING BRIDGE

CROSS REFERENCE TO RELATED APPLICATION

This application claims priority of German patent application no. 10 2014 119 580.9, filed Dec. 23, 2014, the entire content of which is incorporated herein by reference.

FIELD OF THE INVENTION

The invention relates to a digital optical instrument including two eyepieces or oculars and a folding bridge for adapting the eyepiece distance to the interpupillary distance of the user, in particular digital field glasses.

BACKGROUND OF THE INVENTION

Field glasses are predominantly obtainable with a binocular embodiment so as to be able to observe distant objects in a magnified manner with both eyes. For this purpose, conventional analog field glasses are typically embodied with a lens configuration, for example, as so-called theater or opera glasses, or as prism field glasses. Conventional analog field glasses consist of two telescopes connected to one another, each with an objective, a prism system and an eyepiece. In each one of the two telescopes, an intermediate image generated by the objective is observed by way of the associated eyepiece, wherein the eyepiece generates an image on the retina together with the respective ocular lens of the user.

In digital field glasses—which are sometimes also referred to as electronic field glasses—the objective initially images onto an electronic image sensor, for example, a CCD or CMOS chip with resolving power in two dimensions. The image thus recorded digitally or electronically by the image sensor can be processed digitally or electronically and displayed on one or more electronic displays. Digital field glasses often only have one objective and only one image sensor, the image of which is displayed on a left-hand and right-hand display. Although such field glasses only have one objective, they nevertheless have a left-hand and right-hand eyepiece so that the user can observe the left-hand display through the left-hand eyepiece with the left eye and the right-hand display through the right-hand eyepiece with the right eye. Since such digital field glasses have two eyepieces, these can also be referred to as digital binocular field glasses, even though only one objective is present. By way of example, an advantage of digital field glasses is that the observed image can also be recorded, for example, filmed, and stored electronically at the same time as the binocular observation, without further optical outlay. Moreover, binocular field glasses can contain further optical or electronic components, such as for example, an image stabilizer.

In order to adapt the lateral eyepiece distance in the case of binocular field glasses to the individual distance between the eye pupils of the user, the so-called interpupillary distance, the bridge of the field glasses can be embodied as a so-called folding bridge. In the case of field glasses with a folding bridge, the two eyepieces are connected to one another in a pivotable manner by way of a hinge device of the folding bridge with at least one pivot hinge. Hence, the eyepiece distance is adapted to the individual interpupillary distance by the user via the pivot movement of the two eyepieces. A typical interval for the adjustment of the eyepiece distance can lie in the region of approximately 55 mm to 75 mm.

Relatively large field glasses typically have a hinge device with a single central pivot hinge, on which the two eyepieces are pivoted downward in an equal but opposite manner in order to reduce the eyepiece distance. In the case of smaller field glasses, the folding bridge often has a rigid central bridge part and a first and second decentralized pivot hinge for the first or second eyepiece, wherein the first and second decentralized pivot hinge are pivotable independently of one another such that each one of the two eyepieces can be pivoted independently of the respective other eyepiece. Such field glasses are often referred to as compact field glasses.

Typically, the image sensor and the two displays are rectangular and the image recorded by the image sensor is displayed on the two displays one-to-one in relation to the rectangular form of the image sensor and of the displays. That is, the orientation of the displayed image relative to the display is maintained, independently of the position of the folding bridge and hence independently of the absolute orientation of the display relative to the horizontal. Expressed differently, the image displayed by the display and observed by the user rotates together with the display about an axis parallel to the optical axis relative to the horizontal when the user adjusts the folding angle of the folding bridge. This leads to the left-hand image rotating together with the left-hand display in a counterclockwise direction and the right-hand image rotating together with the right-hand display in a clockwise direction when the user pivots the two eyepieces downward and reduces the pivot angle of the folding bridge in order thus to reduce the eyepiece distance. The rotation of the image observed by the user connected therewith is typically unwanted.

The documents JP 11-064740 and JP 11-112851 each describe binoculars with a digital camera. An image tilt in the context of a folding bridge position is not considered.

JP 2004-191861 describes a binocular system, in which an imaging element is introduced into the beam path in order to record an image. The system contains means for determining the rotational angle in the form of a conductive pattern. Image data are corrected by segment-by-segment image processing. The user observes the image not by way of displays, but rather conventionally by way of optical elements. There is no display of the recorded image in the field glasses. Hence, this binocular system is not the pair of digital field glasses, but rather a pair of conventional analog field glasses, in which a CCD can be inserted merely temporarily in one of the two optical beam paths behind the prism system. While the CCD is inserted into the beam path, this beam path is blocked to the user.

U.S. Pat. No. 7,164,528 B2 proposes to define an image-displaying field on two LCDs in digital field glasses respectively with an objective and a sensor and subsequently to rotate the image on the respective LCDs. Thus, although the user can see a non-reversed and erect, rectangular image in the image-displaying fields within the eyepiece, the image-displaying fields are disadvantageously significantly smaller than the respective LCD, and so a large part of the LCDs remains unused and the LCDs need to be significantly larger than the field which is visible with the respective eyepiece. This can have disadvantageous effects on the costs, the power consumption, the spatial conditions and the configuration of the eyepieces.

SUMMARY OF THE INVENTION

It is an object of the invention to provide a digital optical instrument, in particular digital field glasses having a folding bridge, in which the image observed on the displays via the eyepieces maintains its orientation relative to the observed scene or relative to the horizontal and remains erect, independently of the adjustment of the folding bridge.

A further aspect of the object is to provide such a digital optical instrument, in particular such digital field glasses with a folding bridge, in which the area of the displays can be used in an ideal fashion.

A further aspect of the object is to provide such a digital optical instrument, in particular such digital field glasses with a folding bridge, in which costs and energy consumption of the displays can be saved and which enables a compact configuration of the eyepieces.

The invention relates to a digital optical instrument, more particularly digital field glasses—sometimes also referred to as an electronic optical instrument, more particularly electronic field glasses—with a folding bridge for adapting the eyepiece distance to the interpupillary distance of the user.

The digital optical instrument includes a first eyepiece with a first electronic display for the first eye of the user, a second eyepiece with a second electronic display for the second eye of the user, and an objective which defines an optical axis and which images an observed scene onto an electronic image sensor. By way of example, the image sensor is a conventional, typically rectangular CCD or CMOS image sensor with resolving power in two dimensions.

The digital optical instrument furthermore includes a folding bridge with a hinge device, via which the first and second eyepiece are connected to one another in a pivotable manner parallel to the optical axis. Using this, the user can adapt the eyepiece distance between the first and the second eyepiece to his individual interpupillary distance by virtue of adjusting the folding angle of the hinge device. The folding angle is formed as an angle between the first and the second eyepiece in relation to the hinge device in the plane perpendicular to the pivot axis of the hinge device. By adjusting the folding angle of the hinge device, the first and/or second display is tilted mechanically relative to the image sensor about an axis parallel to the optical axis in the plane perpendicular to the optical axis.

According to the invention, a first bounding frame which is tilted about a first tilt angle relative to the image sensor about an axis parallel to the optical axis is now defined in the image recorded by the image sensor, which bounding frame bounds a first portion, which is oblique relative to the image sensor, of the image recorded by the image sensor. In other words, the edges of the first bounding frame extend at an angle to the edges of a rectangular image sensor. What is to be understood by the definition of a tilted bounding frame and the boundary of the oblique portion connected therewith is that the recorded image is not rotated but the recorded image is merely cut out at an angle, with the orientation of the recorded image relative to the observed scene however being maintained. What this means when observing a scene (except for in the case of perpendicularly upward or downward observation) is that the orientation of the recorded image relative to the horizontal is maintained despite the adjustment of the folding bridge.

In other words, the first tilt angle of the first bounding frame is defined depending on the currently set folding angle of the hinge device in accordance with the mechanical tilt of the first or second display.

Then the first portion, which is bounded by the tilted first bounding frame, of the image recorded by the image sensor or of an intermediate portion thereof is transmitted to the first or second display and displayed by the first or second mechanically tilted display.

Thus, the image of an object of the observed scene is transmitted to the first or second display while maintaining the orientation relative to the observed scene—and not relative to the display which is respectively tilting depending on the folding angle—and displayed on the first and/or second display independently of the currently set folding angle while maintaining the orientation of the image of the object relative to the observed scene—and not relative to the display respectively tilting depending on the folding angle—such that the displayed image of the object on the first and/or second display is not rotated when adjusting the folding angle, but rather the image recorded by the image sensor is merely cut out obliquely and the orientation of the image of the object relative to the observed scene is maintained independently of the currently set folding angle, from the recording via the image sensor to the display on the first and/or the second display.

Thus, the transmission and actuation of the respective display is brought about while maintaining the absolute orientation of the recorded image relative to the observed scene or relative to the horizontal, that is, without rotating the recorded image relative to the observed scene or relative to the horizontal. Expressed differently, the recorded image remains erect relative to the observed scene and relative to the horizontal, from the recording by the image sensor up until the display on the respective display or in each process step, and so lines which extend horizontally and vertically on the image sensor in relation to the surroundings remain horizontal and vertical lines from the recording by the image sensor up until the display on the respective display or in each process step. In other words, a first portion which is oblique relative to the image sensor is taken from the image recorded by the image sensor, the portion substantially completely filling out the first and/or second display when displayed on the first or second display. Thus, the first and/or second portion is already "cutout in a tilted manner" in accordance with the mechanical tilt of the first and/or second display generated by the adjustment of the folding bridge, but it is not rotated relative to the observed scene or relative to the horizontal during the transmission to the respective display and during the display on the respective display. Hence, the orientation of the recorded image—in other words of the image content—is maintained as a whole relative to the image sensor or relative to the digital optical instrument, from the recording of the image by the image sensor up until the display on the first and second display.

The respective image already cut out obliquely on the image sensor and depicted on the first and/or second display can therefore completely fill out the display such that, advantageously, a loss of usable display area, which would, for example, be created by a rotation of the image on the display, can be avoided. As a result, the area of the display of the digital optical instrument can be used completely, independently of the set folding angle, that is, at any currently set folding angle.

Preferably, the first oblique portion is smaller than the image recorded by the image sensor and the first portion preferably lies within the sensor area of the image sensor at each adjustable folding angle.

Preferably, the first tilt angle of the first bounding frame corresponds to the tilt angle of the mechanical tilt of the first or second display for each set folding angle of the hinge device and the first portion, which is bounded by the tilted first bounding frame, of the image recorded by the image sensor is transmitted to the first or second display without rotating the recorded image relative to the observed scene or relative to the horizontal and relative to the digital optical instrument as a whole, and it is displayed on the first or second display without rotation of the recorded image relative to the observed scene or relative to the horizontal and relative to the digital optical instrument as a whole. Accordingly, the first portion, which is bounded by the tilted first bounding frame, of the image recorded by the image sensor is transmitted to the first or second display while maintaining the orientation of the recorded image and while maintaining the orientation of this portion relative to the observed scene and displayed on the first or second display.

In accordance with a preferred symmetrical embodiment of the digital optical instrument, the image sensor is fastened to part of the optical instrument which experiences substantially no tilting relative to the observed scene when adjusting the folding angle of the hinge device. By way of example, the image sensor can be fastened to part of the folding bridge which maintains its orientation relative to the horizontal despite adjusting the folding angle. To this end, the folding bridge can include, for example, two pivot hinges coupled to one another, wherein the two coupled pivot hinges pivot symmetrically in opposite directions and a non-pivoting bridge part is arranged between the two pivot hinges coupled in opposite directions. The opposing coupling can be implemented via, for example, toothed wheels or a belt drive.

Preferably, a second bounding frame which is tilted about a second tilt angle relative to the image sensor about an axis parallel to the optical axis is defined in the image recorded by the image sensor, which second bounding frame therefore bounds a second oblique portion of the image recorded by the image sensor, wherein the second tilt angle of the second bounding frame is defined depending on the currently set folding angle of the hinge device in accordance with the mechanical tilt of the second display.

Preferably, the second oblique portion is smaller than the image recorded by the image sensor and the second portion preferably lies within the sensor area of the image sensor at each adjustable folding angle.

In this symmetrical digital optical instrument, the first portion, which is bounded by the tilted first bounding frame, of the image recorded by the image sensor is displayed by the first mechanically tilted display, in particular without rotation of the image relative to the observed scene or relative to the horizontal, and the second portion, which is bounded by the tilted second bounding frame, of the image recorded by the image sensor is displayed by the second mechanically tilted display, in particular without rotation of the image relative to the observed scene or relative to the horizontal.

In the process, it is advantageously possible to keep the image processing simple and nevertheless use both displays in their entirety.

In this symmetrical digital optical instrument, the image sensor is not tilted when adjusting the folding angle during normal use of the optical instrument and it remains aligned horizontally in the transverse direction, wherein "normal use" means that the connecting line between the first and second eyepiece is held substantially horizontally. In the case of a rectangular image sensor, the latter therefore remains oriented in an erect manner despite an adjustment of the folding angle such that the upper and lower edge of the image sensor extend horizontally and the left-hand and right-hand edge of the image sensor extend vertically and this orientation remains unchanged despite an adjustment of the folding angle. In other words, the upper and lower edge of the image sensor remain parallel to a connecting line between the first and second eyepiece during the use of the digital field glasses. In other words, the first and/or second bounding frames in the image recorded by the image sensor are rotated in response to the adjustment of the folding angle.

In an expedient manner, the first tilt angle of the first bounding frame relative to the image sensor and the second tilt angle of the second bounding frame relative to the image sensor are defined automatically against one another for each currently set folding angle of the hinge device.

Preferably, the digital optical instrument is a pair of digital field glasses, in which the hinge device includes a single central pivot hinge or opposing coupled pivot hinges, about which the first and the second eyepiece are pivoted in opposite directions.

Here, the merely one image sensor is preferably fastened to the hinge device in such a way that the image sensor remains aligned horizontally when the folding angle of the hinge device is adjusted during normal use of the optical instrument. In other words, the first and second eyepieces pivot in opposite directions relative to the image sensor, in each case by half the folding angle. Hence, the first tilt angle of the first bounding frame relative to the image sensor and the second tilt angle of the second bounding frame relative to the image sensor are equal and opposite for each currently set folding angle of the hinge device. The first tilt angle of the first bounding frame relative to the image sensor equals the tilt angle of the mechanical tilt of the first display relative to the horizontal and the second tilt angle of the second bounding frame relative to the image sensor equals the tilt angle of the mechanical tilt of the second display relative to the horizontal. Hence, the invention is particularly suitable for this form of digital field glasses.

Preferably, the digital field glasses have a reference folding angle, at which the first and second display extend parallel to the horizontal during normal use. This reference folding angle can also be referred to as zero position of the folding bridge. The folding angle of the hinge device is measured and a differential folding angle in relation to the reference folding angle is determined for each current folding angle such that the first and second display are respectively tilted mechanically in opposite directions in relation to the horizontal by half the differential folding angle. In order to compensate for this according to the invention, the first tilt angle of the first bounding frame relative to the image sensor is defined as half the differential folding angle and the second tilt angle of the second bounding frame relative to the image sensor is defined as half the differential folding angle with an opposite sense of rotation for each position of the folding bridge.

As an alternative to the embodiment with merely one central pivot hinge or two coupled pivot hinges, the hinge device can also have two independent decentralized pivot hinges. This type of digital field glasses is typically referred to as compact field glasses. Thus, in this case, the first pivot hinge belongs to the first eyepiece in a decentralized manner and the digital field glasses still include a second decentralized pivot hinge for the second eyepiece and a central rigid bridge part arranged between the two pivot hinges, wherein the first and second eyepiece can be pivoted independently of one another relative to the central rigid bridge part. In this case, the merely one image sensor is fastened to the central rigid bridge part in such a way that the image sensor remains substantially horizontal in the case of opposite and equal adjustment of the folding angle of the first and second pivot hinge, that is, during normal use. The first tilt angle of the first bounding frame relative to the image sensor is now defined depending on the folding angle of the first pivot hinge and the second tilt angle of the second bounding frame relative to the image sensor is defined independently of the first tilt angle and depending on the folding angle of the second pivot hinge.

Advantageously, this allows the independent tilt of the two eyepieces to be compensated for without unnecessary losses in the usable display area of the two eyepieces.

However, the present invention can also be used for asymmetrical digital field glasses, in which the image sensor is arranged together with one of the two displays in a common housing tube—below, this will be the second display in an exemplary manner. When adjusting the folding angle of the hinge device, the housing tube with the second display and the image sensor is tilted mechanically relative to the horizontal about an axis parallel to the optical axis such that the second display and the image sensor are tilted together about the same angle about the axis parallel to the optical axis by the adjustment of the folding angle of the hinge device. Accordingly, this causes a different relative tilt of the first and second display relative to the image sensor. This is because the second display does not experience any mechanical tilt relative to the image sensor, whereas the first display is mechanically tilted relative to the image sensor by the full folding angle.

The following embodiments are provided for compensating the mechanical tilt of the first and second display in such asymmetrical digital field glasses.

In one embodiment, a horizontally aligned intermediate bounding frame is initially defined in the image recorded by the image sensor, which intermediate bounding frame bounds an intermediate portion of the image recorded by the image sensor in order initially to form a horizontal intermediate portion despite the tilted image sensor. The intermediate portion is preferably smaller than the image recorded by the image sensor.

Subsequently, the first and/or second bounding frame is defined with the first and/or second tilt angle relative to the intermediate bounding frame in the horizontally aligned intermediate bounding frame or intermediate portion, wherein the first and/or second tilt angle corresponds to the mechanical tilt of the first and/or second display.

In a further embodiment, an intermediate bounding frame is defined for each folding angle parallel to the horizontal such that the intermediate portion which is bounded by the intermediate bounding frame tilted relative to the image sensor lies parallel to the horizontal. Furthermore, a third bounding frame which is not tilted relative to the image sensor is defined in the image recorded by the image sensor, which third bounding frame bounds a third portion, which is parallel to the image sensor, of the image recorded by the image sensor. Preferably, the first and third portion have the same size.

Furthermore, a first bounding frame which is tilted relative to the intermediate portion is defined in the intermediate portion lying parallel to the horizontal, which first bounding frame bounds the first portion and the tilt of which in relation to the horizontal corresponds to the mechanical tilt of the first display. The first portion is then transmitted to the first display and displayed by the first display without rotation of the image relative to the observed scene or relative to the horizontal, and the third portion, which is not tilted relative to the image sensor, of the image recorded by the image sensor is transmitted to the second display and displayed by the second display without rotation of the image relative to the observed scene or relative to the horizontal.

In a further embodiment, the first and second display extend parallel to the horizontal at a reference folding angle and a differential folding angle is determined in relation to the reference folding angle. The first tilt angle of the first bounding frame is defined to be as large as the differential folding angle. Furthermore, a third bounding frame which has no tilt relative to the image sensor is defined in the image recorded by the image sensor, which third bounding frame bounds a third portion, which is parallel to the image sensor, of the image recorded by the image sensor. Preferably, the first and third portion have the same size.

Subsequently, the first portion, which is bounded by the tilted first bounding frame, of the image recorded by the image sensor is transmitted to the first display and displayed by the first display without rotation of the image relative to the observed scene or relative to the horizontal and the third portion, which is not tilted relative to the image sensor, of the image recorded by the image sensor is transmitted to the second display and displayed by the second display without rotation of the image relative to the observed scene or relative to the horizontal.

Preferably, the image sensor has a rectangular form and the first and/or second display has a rectangular, non-square or square form, and the form of the first and/or second bounding frame is defined with the same aspect ratio as the first and second display, respectively.

The first and/or second eyepiece possibly restricts the area of the first and/or second display visible to the user by mechanical restrictions. Nevertheless, the size of the respective display is selected in such a way that the displays are not substantially larger than the visible area of the respective display in at least one dimension (x or y), and so the area of the respective display can be used in an ideal manner.

In the case of a rectangular, non-square or square form of the first and/or second display and a round visible area of the first and/or second display, the first and/or second display is selected in such a way that the diameter of the round visible area completely covers the respective display in at least one dimension (x or y).

If the first and/or second eyepiece restricts the area of the first and/or second display visible to the user by mechanical restrictions, it is preferably substantially only pixels of the first and/or second display that lie within the visible area of the first and/or second display which are actuated with image data of the image sensor. Pixels lying outside of the visible area remain dark, as a result of which it is possible to save energy depending on the display technology.

Accordingly, if the visible area of the first and/or second display is round, it is merely pixels within the round visible area of the first and/or second display that are actuated with image data from the image sensor.

In accordance with a further embodiment of the invention, the first and/or second displays have a round form and the active display area substantially corresponds to the size of the area visible to the user.

Preferably, the digital optical instrument has a first and/or second folding bridge sensor, via which the folding angle of the hinge device or of the first and/or second pivot hinge is measured. In response to the measured folding angle or angles, it is possible for the first and/or second tilt angle of the first bounding frame relative to the image sensor and/or the second tilt angle of the second bounding frame relative to the image sensor to be defined automatically, for example by a microcontroller, FPGA, DSP or ASIC. The first and/or second folding bridge sensor is embodied, for example, as a magnetic sensor or as a strain gauge. By way of example such folding bridge sensors are described in United States patent application publication 2015/0002938, United States patent application publication 2013/0194666 and United States patent application publication 2015/0054936, the disclosure of which in relation to the folding bridge sensor is herewith incorporated by reference.

However, the optical instrument can also have a setting device, via which the user can define the first tilt angle of the first bounding frame relative to the image sensor and/or the second tilt angle of the second bounding frame relative to the image sensor manually.

In accordance with a special embodiment, the image recorded by the image sensor is stored for the long term. This can be implemented on an internal and external data memory. The recorded image, wherein "image" in this case may also include a video, that is, a sequence of images, is loaded again at a later time for observation on the first and/or second display via the first and/or second eyepiece. In the case of such a time-offset observation of the image, the definition of the first tilt angle of the first bounding frame relative to the image sensor and/or the definition of the second tilt angle of the second bounding frame relative to the image sensor is only undertaken at the time of the later observation in a manner dependent on the folding angle of the hinge device set during the later observation.

BRIEF DESCRIPTION OF THE DRAWINGS

The invention will now be described with reference to the drawings wherein:

FIG. 4 is a schematic of the imaging with the field glasses of FIG. 2 when the folding bridge is in the reference position;

FIG. 9 is a schematic of a first variant of the imaging with the digital binocular field glasses from FIG. 8;

FIG. 10 is a schematic of a second variant of the imaging with the digital binocular field glasses from FIG. 8;

FIG. 11 is a schematic of a third variant of the imaging with the digital binocular field glasses from FIG. 8;

FIG. 12 is a schematic of digital compact field glasses, in which the image sensor is arranged in one of the two tubes, with a first variant of the imaging;

FIG. 13 is a schematic of a second variant of the imaging with the digital compact field glasses from FIG. 12;

DESCRIPTION OF THE PREFERRED EMBODIMENTS OF THE INVENTION

Figure 1:
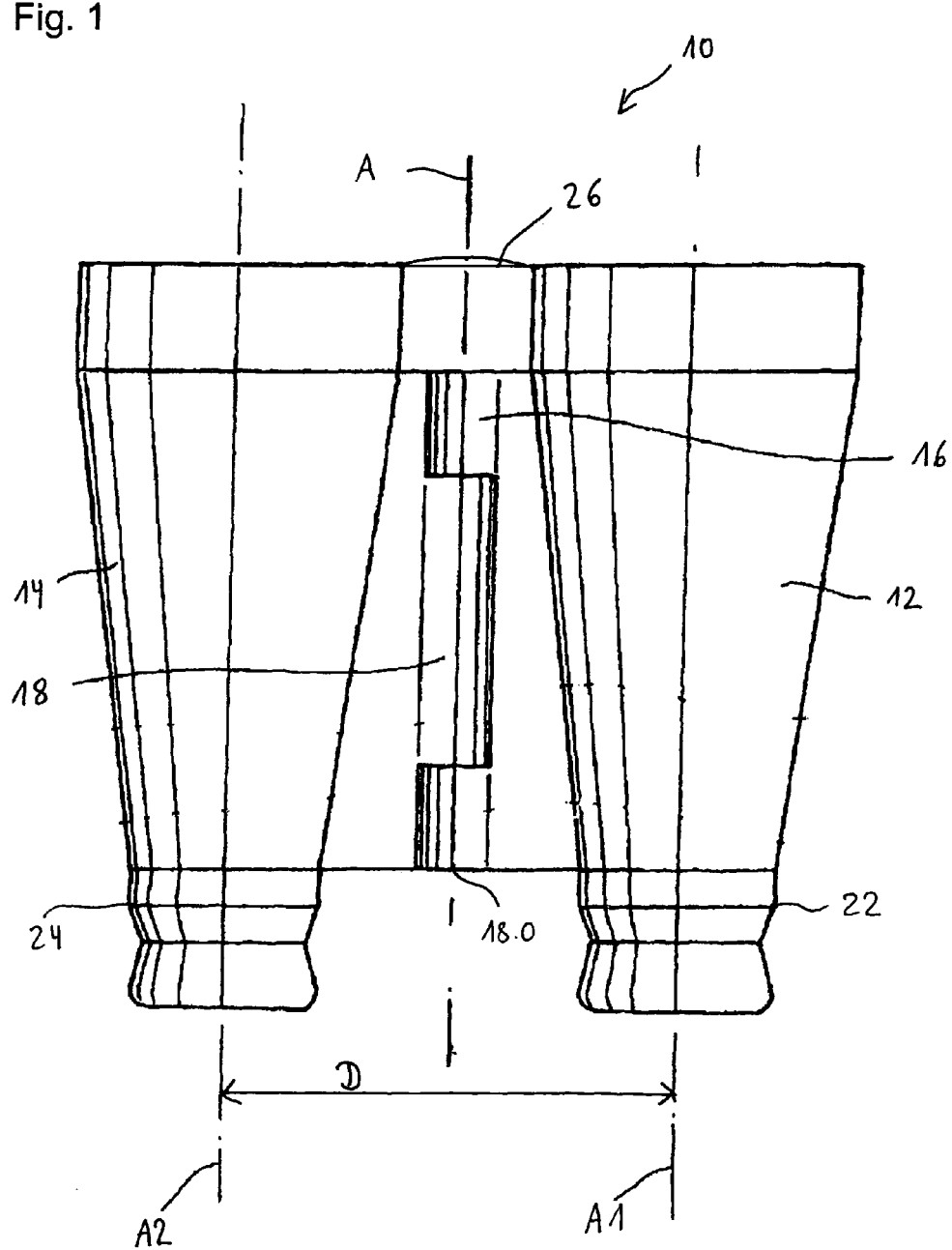
FIG. 1 is a schematic top view of digital binocular field glasses.

With reference to FIG. 1, the digital field glasses 10 have a first and second housing half in the form of a right-hand and left-hand tube (12, 14). The two tubes (12, 14) are connected via a folding bridge 16, which has a hinge device 18 with, in this example, a central pivot hinge 18.0, about the axis of which the two tubes (12, 14) can be pivoted symmetrically in relation to one another. The right-hand and left-hand tube (12, 14) have a right-hand and left-hand eyepiece (22, 24), respectively, the optical axes A1 and A2 of which define the eyepiece distance D. In order to adapt the eyepiece distance D to the interpupillary distance of the user, the two tubes (12, 14) are pivoted toward one another such that the folding angle becomes smaller.

The digital binocular field glasses 10 depicted in FIG. 1 have a single centrally arranged objective 26, which is fastened to the folding bridge 16 in such a way that it maintains its absolute orientation in relation to the horizontal when the two tubes (12, 14) are pivoted, that is, when both tubes (12, 14) are pivoted down in the same way by the user, that is, when, as is conventional during normal use, the connecting line between the two optical axes A1 and A2 is kept horizontal.

Figure 2:
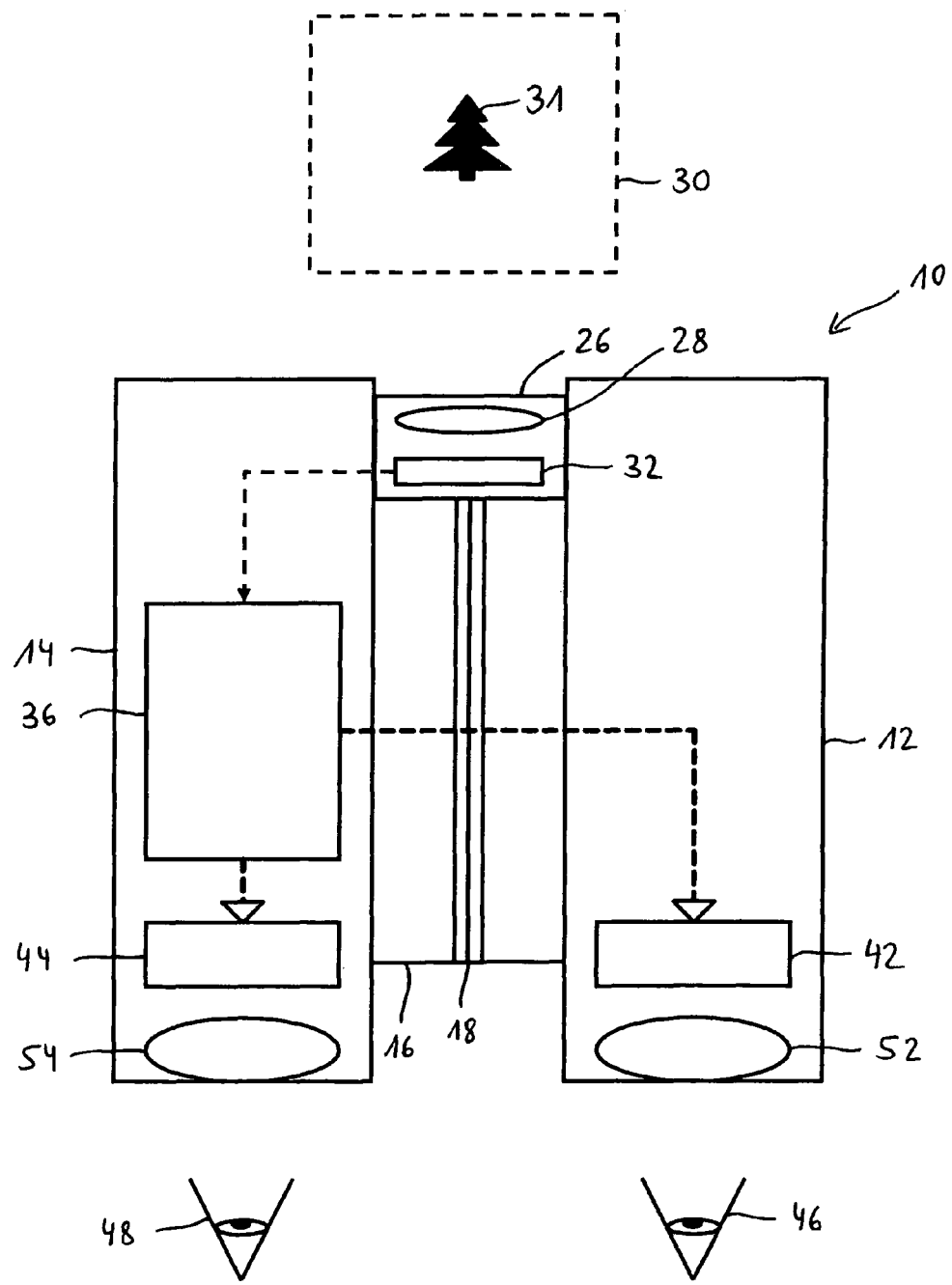
FIG. 2 is a schematic of digital binocular field glasses with a central folding bridge and a central image sensor.

With reference to FIG. 2, the central objective 26 has an objective lens arrangement 28 which, for reasons of simplicity, is symbolized as merely one lens in the drawing. The lens arrangement 28 images an observed scene 30 onto the central image sensor 32. In this example, the image sensor 32 is a rectangular image sensor, which is slightly wider than high (typical image sensors have an aspect ratio (width to height) of, for example, 3:2, 4:3 or 16:9) and therefore records a rectangular image of the scene 30. The image recorded by the image sensor 32 is processed further by a control and image-processing device 36 in the form of a digital processing unit, for example, a microcontroller, FPGA, DSP or ASIC, and displayed on the right-hand first and left-hand second display (42, 44). With his right and left eye (46, 48), the user looks at the image which is respectively displayed on the right-hand and left-hand display (42, 44), which is generated digitally, which originates from the image sensor 32 and which is processed via the control and image processing device 36, through the eyepiece lens arrangements (52, 54)—of which merely one lens is symbolized in the drawing in each case for reasons of simplicity.

Figure 3:
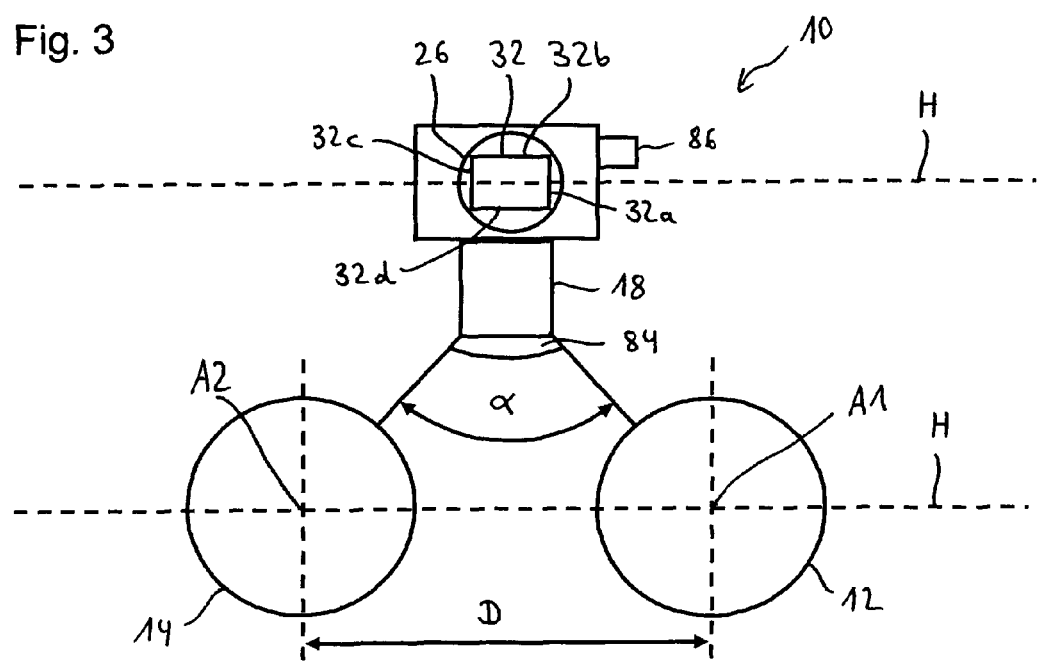
FIG. 3 is a schematic view of the digital binocular field glasses from FIG. 2.
Figure 15:
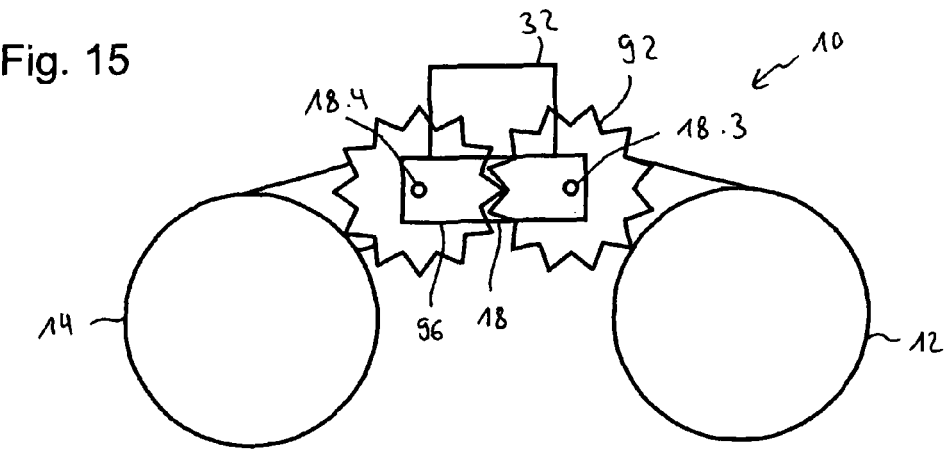
FIG. 15 shows a schematic illustration of a folding bridge with a gear mechanism.
Figure 16:
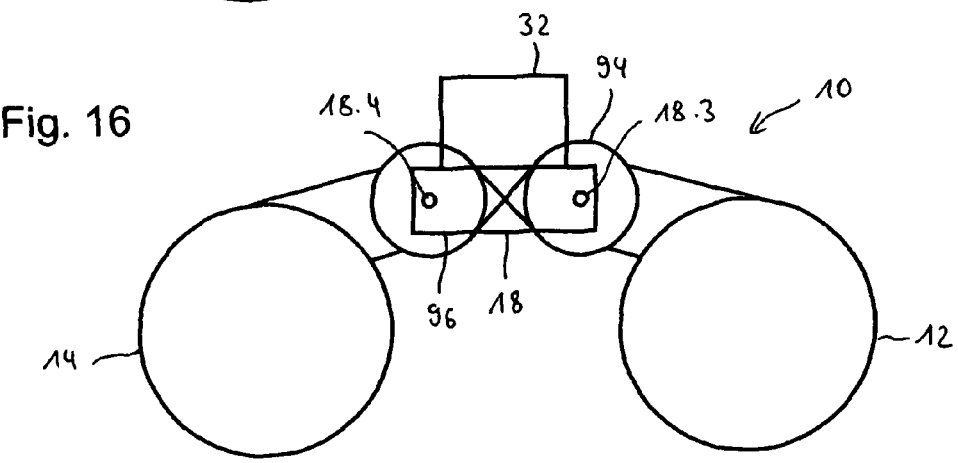
FIG. 16 shows a schematic illustration of a folding bridge with belt mechanism; and, FIG. 17 shows a variant of the definition of the bounding frame.

With reference to FIG. 3, the alignment of the centrally arranged objective 26 with the centrally arranged image sensor 32 remains aligned parallel to the horizontal H, even if the folding angle α of the digital binocular field glasses 10 is adjusted by pivoting the two tubes (12, 14) about the hinge device 18 in order to adjust the eyepiece distance D of the two optical axes (A1, A2) of the two eyepieces (22, 24) (cf. FIGS. 15, 16).

FIG. 4 shows the reference position of the digital binocular field glasses 10. In the reference position, the folding bridge 16 has a reference folding angle αR, which typically, but not necessarily, forms an upper stop for the pivot movement of the two tubes (12, 14). When the folding bridge 16 is in the depicted reference position, the rectangular right-hand display 42 and the rectangular left-hand display 44 are aligned parallel to the horizontal H. The image sensor 32 now records an image 34. A right-hand first and left-hand second bounding frame (56, 58) are defined within the image 34 recorded by the image sensor 32 in the depicted reference position of the folding bridge 16. The right-hand and left-hand bounding frame (56, 58) therefore bound a right-hand and left-hand image portion (62, 64), wherein the two bounding frames (56, 58) exceptionally extend parallel to the horizontal H in the depicted reference position of the folding bridge 16. The bounding frames (56, 58) or the image portions (62, 64) are selected in such a way that the right-hand and left-hand display (42, 44) are completely filled and used therewith. Accordingly, a right-hand and left-hand portion (62, 64) from the recorded image 34 are recorded for being displayed in the right-hand and left-hand display (42, 44), wherein the two image portions (62, 64) are smaller than the image sensor 32 in this example. In FIG. 4, the bounding frames (56, 58) and the portions (62, 64) of the recorded image 34 are therefore exceptionally still not tilted since the folding bridge 16 is in the reference position in which the displays (42, 44) are aligned parallel to the horizontal H, that is, not yet tilted mechanically.

As a result of a mechanical restriction, the user respectively sees a circular visual field (66, 68) in the right-hand and left-hand eyepiece (22, 24), wherein the diameter (d) of the visual fields (66, 68) substantially corresponds to the height (h) of the right-hand and left-hand display (42, 44) such that the area of the displays (42, 44) is used in an ideal manner.

Figure 5:
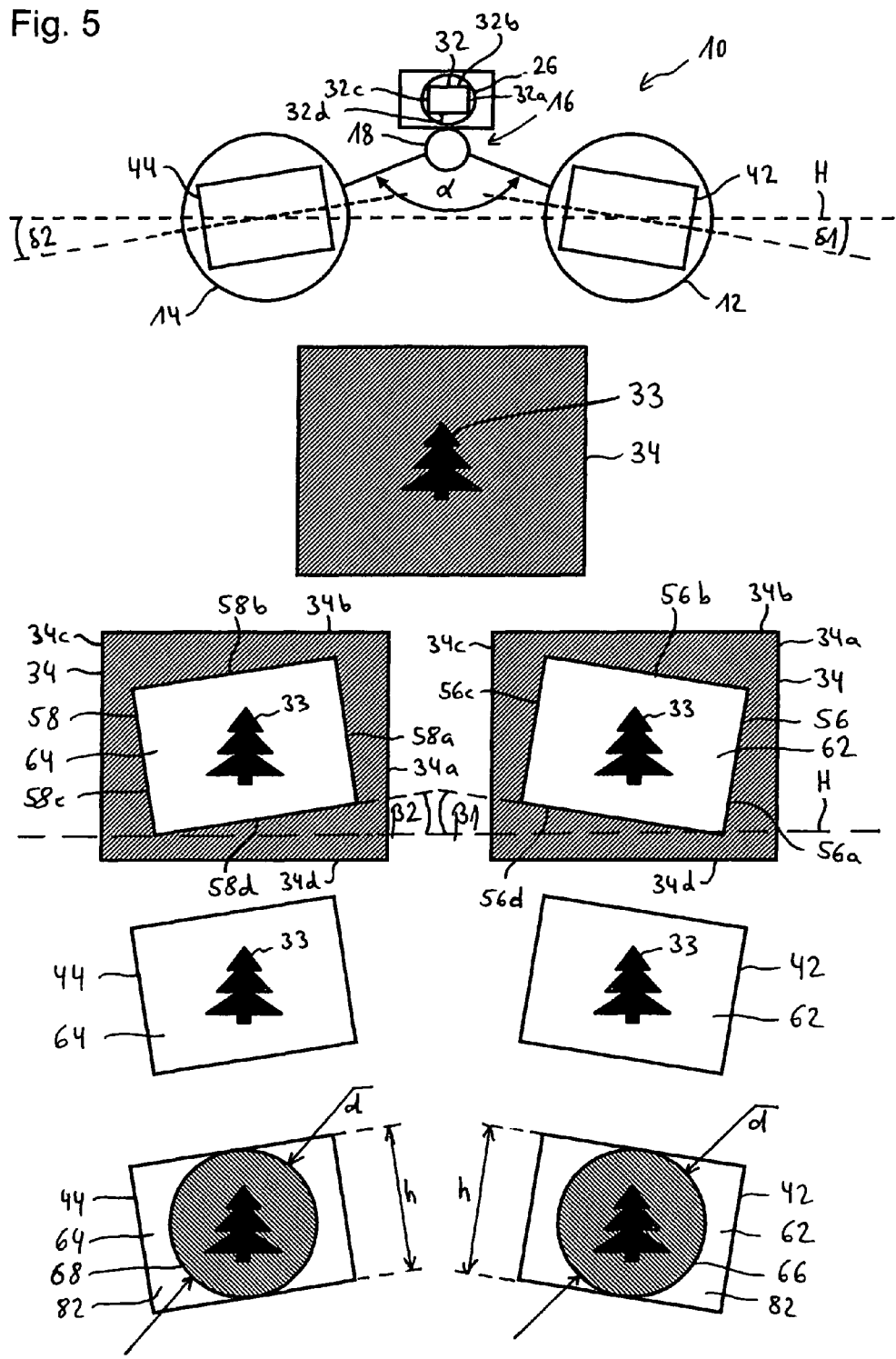
FIG. 5 is like FIG. 4, but with a reduced folding angle.

FIG. 5 now shows the digital binocular field glasses 10 in a folding position of the folding bridge 16 away from the reference position such that the right-hand and left-hand tube (12, 14) are pivoted toward one another and hence the eyepiece distance is smaller than in the reference position of FIG. 4. In this case, the folding bridge 16 has a folding angle $\alpha$, which is less than the reference folding angle $\alpha R$. Here, the reference folding angle $\alpha R$ is not necessarily 180° but, without loss of generality, the reference folding angle $\alpha R$ is typically slightly less than 180°.

As a result of pivoting the two tubes (12, 14), a tilt of the right-hand display 42 about an angle $\delta 1$ and a tilt of the left-hand display 44 about an angle $\delta 2$ are generated. In this example, the tilts of the left-hand and right-hand display (42, 44) are symmetrical such that the angles $\delta 1$ and $\delta 2$ are equal and opposite. Thus, the following applies in this symmetrical configuration of the hinge device 18:

$$\delta 2 = -\delta 1 = (\alpha R - \alpha)/2.$$

In this embodiment, the objective 26 with the image sensor 32 is attached to the folding bridge 16 in such a way that the orientation thereof in relation to the horizontal H remains uninfluenced by the pivot movement of the two tubes (12, 14), that is, the objective 26, more precisely the rectangular image sensor 32, remains aligned parallel to the horizontal H for any folding angle $\alpha$. Hence, the orientation of the image 34 recorded by the image sensor 32 relative to the horizontal H is independent of the current setting of the folding angle $\alpha$. In the recorded image 34, a right-hand bounding frame 56, which is tilted clockwise about the angle $\beta 1$, and a left-hand bounding frame 58, which is tilted counterclockwise about the angle $\beta 2$, are defined in the recorded image 34 for the right-hand display 42. Accordingly, the edges (56a-d, 58a-d) of the respective bounding frame (56, 58) extend obliquely to the edges 32a-d of the image sensor 32 and therefore obliquely to the edges 34a-d of the image 34 recorded by the image sensor 32. In this example, the right-hand and left-hand tilt angles ($\beta 1$, $\beta 2$) are equal and opposite such that the bounding frames (56, 58) bound image portions (62, 64) respectively tilted oppositely about the angles ($\beta 1$, $\beta 2$). What should be noted here is that it is merely the bounding frames (56, 58) or the image portions (62, 64) that are tilted in relation to the image sensor 32 and in relation to the horizontal H, but the displayed image 34 is not rotated. The orientation of the displayed image 34 relative to the observed scene or relative to the horizontal remains unchanged in these process steps up to and including the display on the respective display if the user holds the digital binocular field glasses 10 straight.

The respective image portions (62, 64) which are tilted in opposite directions about the angles ($\beta 1$, $\beta 2$) are tilted to the same extent as displays (42, 44), that is, $\beta 1 = \delta 1$ and $\beta 2 = \delta 2$ applies such that the image portions (62, 64) are displayed on the right-hand and left-hand display (42, 44) while maintaining the orientation thereof relative to the image sensor 32 and relative to the horizontal H, that is, in a manner erect and without rotation of the image, and with complete use of the display area. This can also be identified by virtue of the image 33 of the object 31 symbolized as a tree remaining erect in the recorded image 34 during the image processing and not being rotated relative to the observed scene or relative to the horizontal.

Therefore, the image displayed by the two displays (42, 44) is erect independently of the currently set folding angle $\alpha$, that is, for any folding angle $\alpha$, and the area of the two displays (42, 44) can nevertheless be exploited to the full. Here, the image itself is not rotated relative to the image sensor 32 and relative to the observed scene or relative to the horizontal H; instead, as explained above, it is merely cut out with an oblique bounding frame (56, 58).

Figure 6:
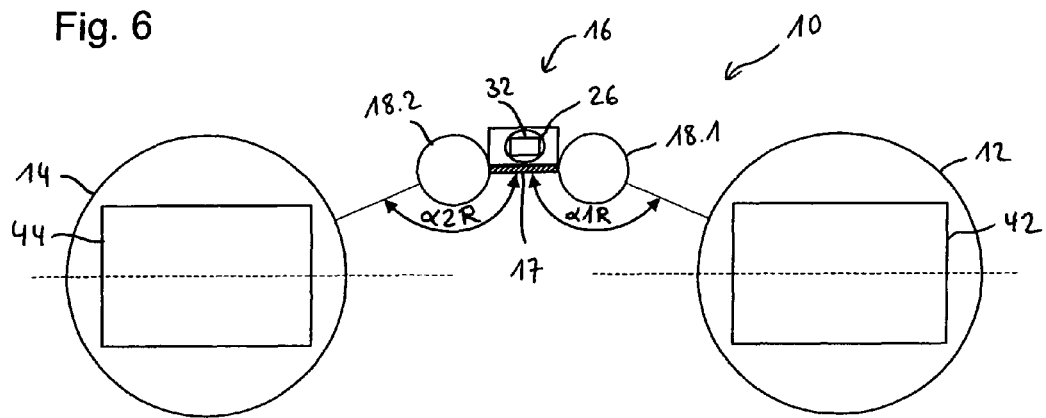
FIG. 6 is a schematic view of compact field glasses in the reference position of the folding bridge.
Figure 7:
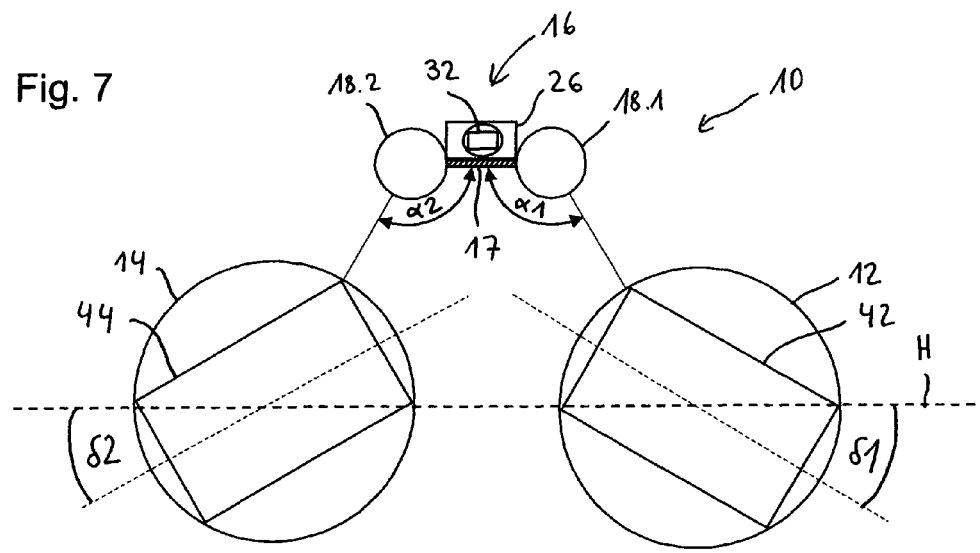
FIG. 7 is like FIG. 6, but with a reduced folding angle on both sides.

FIGS. 6 and 7 show digital binocular compact field glasses 10, in which the folding bridge 16 has a hinge device with an independent right-hand and left-hand pivot hinge (18.1, 18.2). A central rigid bridge part 17, on which the objective 26 with the image sensor 32 is attached, is fixed to the right-hand and left-hand pivot hinge (18.1, 18.2). FIG. 6 shows the pair of compact field glasses 10 in the reference position, in which the right-hand and left-hand display (42, 44) extend parallel to the horizontal H. In the reference position, the right-hand and left-hand pivot hinge (18.1, 18.2) have a right-hand reference angle $\alpha 1R$ and a left-hand reference angle $\alpha 2R$.

With reference to FIG. 7, the digital binocular compact field glasses 10 are depicted with folding angles $\alpha 1$ and $\alpha 2$ which have been adjusted relative to the reference position. It is possible to identify that the two tubes (12, 14) can be pivoted independently of one another in this embodiment such that the mechanical tilt angles $\delta 1$ and $\delta 2$ of the right-hand and left-hand display (42, 44) may be different. In this example, the following relations apply to the mechanical tilt angles $\delta 1$ and $\delta 2$ of the two displays (42, 44):

$$\delta 1 = \alpha 1R - \alpha 1$$

$$\delta 2 = \alpha 2R - \alpha 2$$

when the rigid bridge part 17 is kept horizontally. The tilted bounding frames (56, 58) and the tilted image portions (62, 64) are defined like in the example described on the basis of FIG. 5, the difference being that it is now possible to define different tilt angles $\beta 1 = \delta 1$ and $\beta 2 = \delta 2$.

Figure 8:
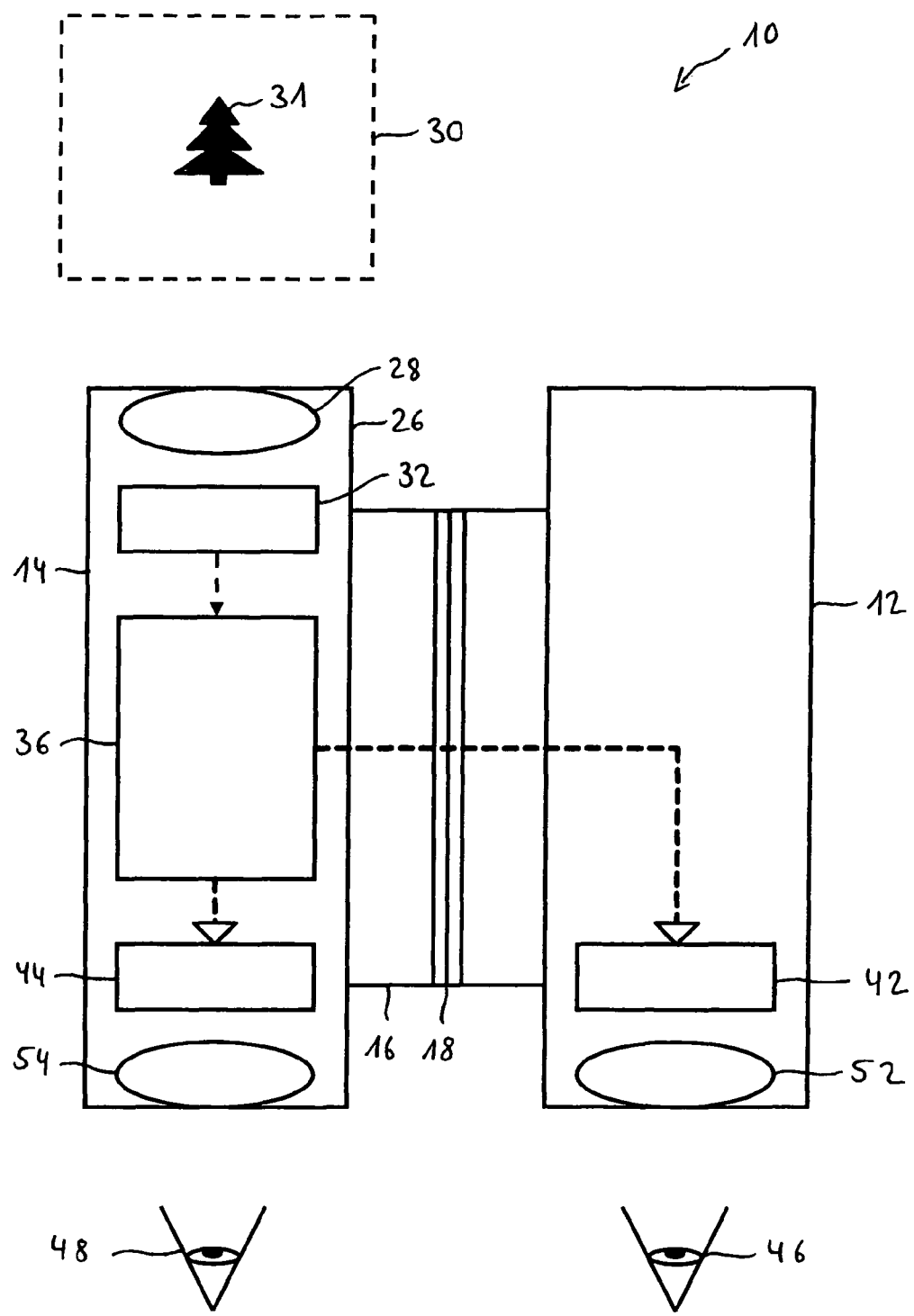
FIG. 8 is a schematic of a further embodiment of digital binocular field glasses, in which the image sensor is arranged in one of the two tubes.

With reference to FIG. 8, the objective 26 with the image sensor 32 can also be arranged in one of the two tubes (12, 14) instead of centrally in a rotationally secured manner at the folding bridge 16 in a further embodiment of the digital binocular field glasses 10. In the present example, the objective 26 with the image sensor 32 is arranged in the left-hand second tube 14. This leads to the image sensor 32 being tilted in accordance with the left-hand display 44. Hence, there is no relative tilt between the image sensor 32 and the left-hand display 44, but there is still always a relative tilt between the right-hand display 42 and the image sensor 32. This is solved by an appropriate adaptation of the image processing and display on the two displays (42, 44), as follows.

With reference to FIG. 9, in a variant, a horizontal intermediate bounding frame 72 is initially defined in the image 34 recorded by the image sensor 32. The horizontal intermediate bounding frame 72 bounds an intermediate portion 74, which is aligned parallel to the horizontal H, of the recorded image 34. Subsequently, a procedure is carried out for the right-hand and left-hand display (42, 44), which are tilted relative to the horizontal intermediate bounding frame 72, as is described on the basis of FIGS. 4 and 5, with the right-hand and left-hand tilted bounding frame (56, 58) being defined in the horizontally aligned intermediate portion 74 of the recorded image. Thus, like in the embodiment described in FIG. 5, a bounding frame 56 which is tilted about the angle $\beta 1$ in the clockwise direction and a bounding frame 58 which is tilted about the angle $\beta 2$ in the counterclockwise direction are defined relative to the intermediate portion 74 and within the intermediate portion 74. The image portion 62 which is tilted in the clockwise direction is displayed on the right-hand display 42 and the image portion 64 which is tilted in the counterclockwise direction is displayed on the left-hand display 44.

With reference to FIG. 10, an intermediate bounding frame 72 which extends parallel to the horizontal H is initially defined for the right-hand display 42 in a further variant so as to bound a horizontally extending intermediate portion 74. For the purposes of displaying on the right-hand display 42, a procedure is carried out in accordance with the variant described on the basis of FIG. 9, that is, the right-hand bounding frame 56 which is tilted in the clockwise direction about an angle $\beta 1$ relative to the horizontally extending intermediate portion 74 is defined within the horizontal intermediate portion 74. The tilted image portion 62 which is bounded by the tilted right-hand bounding frame 56 is subsequently displayed on the equally tilted right-hand display 42. A third bounding frame 76 which extends parallel to the image sensor 32 tilted with the left-hand tube 14 is defined in the image 34 for the left-hand display 44. The third bounding frame 76 therefore bounds a third image portion 78 which extends parallel to the image sensor 32 and the recorded image 34. The third image portion 78 has the same dimensions as the tilted right-hand image portion 62. Accordingly, the image is merely cut parallel to the image sensor 32 for the left-hand display 44 in order to obtain the same image dimensions as for the right-hand display 42. The tilt of the third bounding frame 76 relative to the horizontal H corresponds to the tilt of the image sensor 32 relative to the horizontal H.

FIG. 11 shows a further variant for the image processing and display when the image sensor 32 is mechanically tilted with one of the two tubes, in this case the left-hand tube 14. Here, like in the variant described on the basis of FIG. 10, a third bounding frame 76 is defined for the display on the left-hand display 44, which third bounding frame is tilted parallel to the mechanically tilted image sensor 32 and hence tilted by an angle $\beta 2$ relative to the horizontal H. In other words, the third bounding frame 76 or the third image portion 78 bounded by the bounding frame 76 extends parallel to the recorded image 34.

For the display on the right-hand display 42, the tilted right-hand bounding frame 56 is now defined directly in the image 34 recorded by the image sensor 32. The right-hand bounding frame 56 is defined with the tilt angle $\beta 1$ relative to the horizontal H or the tilt angle $2 \times \beta 1$ relative to the image sensor 32 or the recorded image 34. Here, the angle $2 \times \beta 1$ corresponds to the relative folding angle $\alpha R - \alpha$. The right-hand bounding frame 56 for cutting out the right-hand image portion 62, which is displayed on the right-hand display 42, is therefore cut out directly with the relative angle between the right-hand and left-hand display (42, 44). The image for the left-hand display 44—that is, the display in the tube with the image sensor 32—is cut parallel to the image sensor 32 in order to obtain the same image dimensions as for the right-hand display 42.

Referring again to FIGS. 4 and 5, it is also possible to use square displays (42, 44) instead of the rectangular, non-square displays (42, 44). This is advantageous in that fewer losses in the display area, that is, less waste, is/are produced in the case of a circular mechanical restriction 68 by the eyepiece. The region 82 of the display area lying outside of the round optically restricted visual field portion 68 is preferably not actuated with image data. In other words, preferably only visible display pixels which are situated within the round visual field portion 68 are actuated by the software of the control and image-processing device 36. Alternatively, it is also possible to use round displays (42, 44).

The folding angle $\alpha$ can be detected automatically via a folding bridge sensor 84 such that the tilt angles ($\beta 1$, $\beta 2$) of the bounding frames (56, 58) are defined automatically by the control and image processing device 36 in response to the measured folding angle. Alternatively, the digital binocular field glasses 10 can have a setting device 86, for example, a rotary knob, via which the tilt angle or angles $\beta 1$ and $\beta 2$ of the bounding frames are set. By way of example, such a setting device 86 is depicted in FIG. 3.

Figure 14:
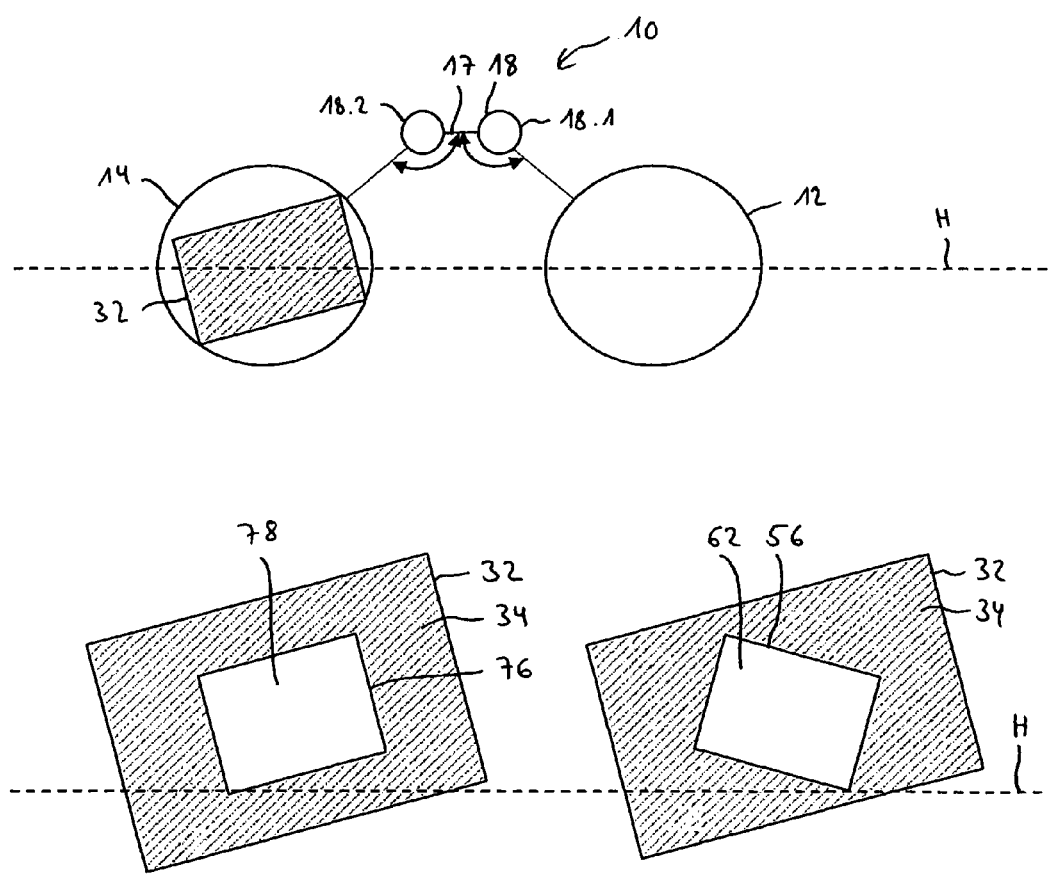
FIG. 14 is a schematic of a third variant of the imaging with the digital compact field glasses from FIG. 12.

A pair of digital binocular compact field glasses 10, in which the folding bridge 16 has a hinge device 18 with an independent right-hand and left-hand pivot hinge (18.1, 18.2), is depicted with reference to FIGS. 12 to 14. In this respect, reference can be made to the embodiment depicted in FIGS. 6 and 7. However, in accordance with the embodiments depicted in FIGS. 9 to 11, the objective 26 is arranged in one of the two tubes (12, 14)—in the left-hand second tube 14 in the present example. Here, the bounding frame or frames (56, 58, 72, 76) is/are defined in accordance with what was described on the basis of FIGS. 9 to 11, wherein the sum of the left-hand and right-hand folding angles $\alpha 1 + \alpha 2$ in the compact field glasses with two independent pivot hinges (18.1, 18.2) corresponds to the folding angle $\alpha$ in the field glasses with the one pivot hinge 18.0.

FIG. 15 schematically shows a folding bridge with a hinge device 18 including two pivot hinges (18.3, 18.4) coupled to one another. The coupling of the two pivot hinges (18.3, 18.4) is implemented via a mechanism, for example, a gear mechanism 92 (FIG. 15) or a belt mechanism 94 (FIG. 16). The coupling is embodied in such a way that pivoting of the pivot hinges (18.3, 18.4) symmetrically in opposite directions relative to the bridge part 96 is forced via the mechanism (92, 94). The objective 26 and the image sensor 32 are fastened to the bridge part 96 so that the two tubes (12, 14) or the two displays (42, 44) pivot symmetrically in opposite directions relative to the objective 26 and relative to the image sensor 32.

Figure 17:
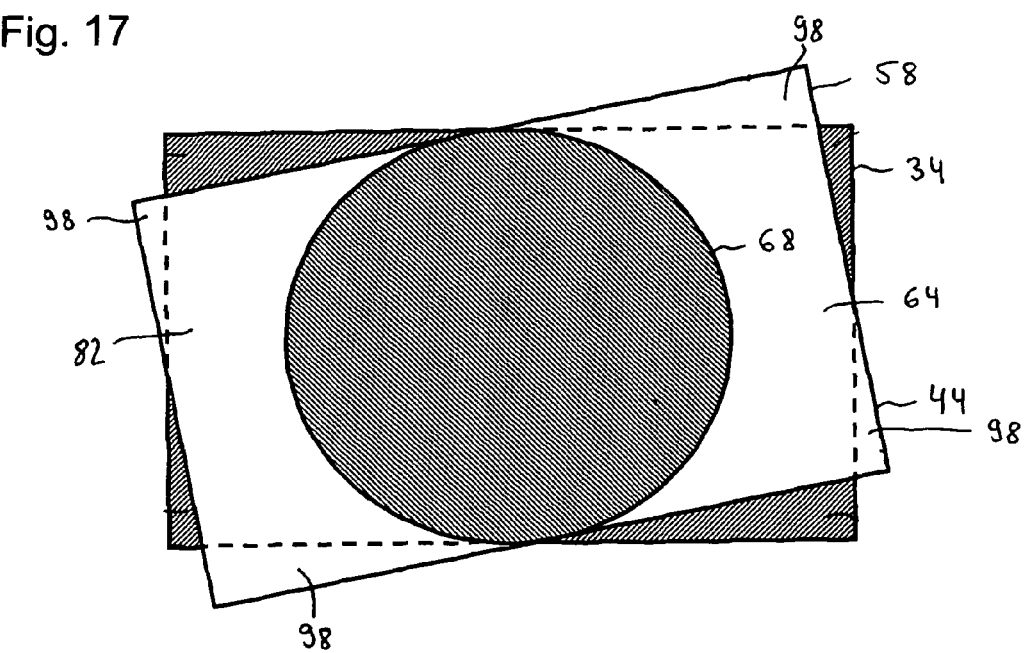

In the embodiments depicted in FIGS. 4 to 14, the bounding frames (56, 58, 72, 76) are each smaller than the image sensor 32. In other words, the oblique bounding frame is defined completely within the image sensor 32 and the oblique image portion lies completely within the recorded image 34. Accordingly, an unused edge of the image 34 recorded by the image sensor 32 remains around the bounding frame in this embodiment. The advantage of this is that the display or displays (42, 44), which typically have a lower resolution than the image sensor 32, can be used in their entirety. However, with reference to FIG. 17, it is also possible to define the oblique bounding frame—in FIG. 17, this is the left-hand bounding frame 58 in an exemplary manner—as having approximately the same size as the image sensor 32. This leads to corner regions 98 of the image portion 64 not containing any image information as the image portion 64 projects beyond the image sensor 32 at the corners. However, these lost corner regions 98 preferably lie in the region 82 outside the visual field 68, which, in particular, is round, such that at least substantially no image component visible in the visual field is lost within the round visual field 68. This applies correspondingly to the right-hand bounding frame 56 and the remaining bounding frames (72, 76).

In conclusion, a correction of the recorded image 34 is proposed, in which a portion of the sensor image is stored. So that the recorded image 34 is always displayed in an erect manner to the user, a correction of the display is undertaken when the displays (42, 44) are tilted relative to one another as a result of the folding bridge position. To this end, respectively one portion which subsequently completely fills the respective display (42, 44) is taken from the recorded image 34. This portion is cut out of the recorded image 34 in a manner respectively tilted in accordance with the tilt of the display and subsequently this already oblique portion of the recorded image 34 is transmitted to the associated display and displayed there.

It is understood that the foregoing description is that of the preferred embodiments of the invention and that various changes and modifications may be made thereto without departing from the spirit and scope of the invention as defined in the appended claims.

LIST OF REFERENCE SIGNS

10 Digital optical instrument
12 Right-hand tube
14 Left-hand tube
16 Folding bridge
17 Bridge part
18 Hinge device
18.0 Central pivot hinge
18.1 Right-hand pivot hinge
18.2 Left-hand pivot hinge
18.3 Right-hand pivot hinge
18.4 Left-hand pivot hinge
22 Right-hand eyepiece
24 Left-hand eyepiece
26 Objective
28 Objective lens arrangement
30 Scene
31 Object
32 Image sensor
32a-d Edges of the image sensor
33 Image of the object
34 Recorded image
34a-d Edges of the recorded image
36 Image processing device
42 Right-hand display
44 Left-hand display
46 Right eye
48 Left eye
52 Right-hand eyepiece lens arrangement
54 Left-hand eyepiece lens arrangement
56 Right-hand bounding frame
56a-d Edges of the right-hand bounding frame
58 Left-hand bounding frame
58a-d Edges of the left-hand bounding frame
62 Right-hand image portion
64 Left-hand image portion
66 Right-hand visual field
68 Left-hand visual field
72 Intermediate bounding frame
74 Intermediate portion
76 Third bounding frame
78 Third image portion
82 Region of the display lying outside of the visual field
84 Folding bridge sensor
86 Setting device
92 Gear mechanism
94 Belt mechanism
96 Bridge part
98 Corner regions
A Optical axis
A1 Right-hand eyepiece axis
A2 Left-hand eyepiece axis
d Visual field diameter
D Eyepiece distance
h Display height
H Horizontal
α Folding angle
α1 Right-hand folding angle
α2 Left-hand folding angle
αR Reference folding angle
αR−α Differential folding angle
α1R Right-hand reference folding angle
α2R Left-hand reference folding angle
β1 Tilt angle of the right-hand bounding frame
β2 Tilt angle of the left-hand bounding frame
δ1 Tilt angle of the right-hand display
δ2 Tilt angle of the left-hand display

What is claimed is:

1. A digital optical instrument comprising:
a folding bridge for adapting an interocular distance (D) to an interpupillary distance of a user having a first eye and a second eye;
a first eyepiece having a first electronic display for the first eye of the user;
a second eyepiece having a second electronic display for the second eye of the user;
said first and second eyepieces defining first and second optical axes (A1, A2), respectively,
an image sensor configured to record an image;
an objective defining a third optical axis (A) and configured to image an observed scene containing an object onto said image sensor so as to define an image recorded thereby;
said first eyepiece and said second eyepiece conjointly defining the interocular distance (D);
said folding bridge having a hinge device defining a folding angle (α) and pivotally interconnecting said first eyepiece and said second eyepiece so as to enable the interocular distance (D) to be adaptable to the individual interpupillary distance of the user via an adjustment of said folding angle (α) of said hinge device;
said folding bridge being configured to mechanically tilt at least one of said first and said second electronic display relative to said image sensor about one of said first and second optical axes (A1, A2) parallel to said third optical axis (A);

a first bounding frame defined in said image and being tilted about a first tilt angle (β1) relative to said image sensor;

said first bounding frame delimiting a first portion of said image recorded by said image sensor;

said first tilt angle (β1) of said first bounding frame being defined in dependence upon said folding angle (α) of said hinge device;

wherein an image of said object of said observed scene is transmitted to said first or second electronic display while maintaining the orientation relative to the observed scene and said image of said object, while maintaining the orientation of said image of said object relative to said observed scene, is displayed on corresponding ones of said first and second electronic displays, so that when said folding angle is adjusted, not the image of said object displayed on the corresponding ones of said first and second electronic displays is rotated, but rather, said image recorded by said image sensor is cut out obliquely and the orientation of said image of said object is maintained relative to the observed scene independently of the just adjusted folding angle from recordation by said image sensor to the display on the corresponding ones of said first and second electronic displays; and, a storage device configured to store said image recorded by said image sensor and to load said image at a later point in time for observation on at least one of said first and said second electronic displays.

2. The digital optical instrument of claim 1, wherein:
said first tilt angle (β1) of said first bounding frame corresponds to the tilt angle of the mechanical tilt of said first electronic display or said second electronic display; and,
said first portion of said image recorded by said image sensor and delimited by said first bounding frame is transmitted to said first electronic display or said second electronic display while maintaining the orientation of said recorded image relative to said observed scene and is displayed on said first or said second display.

3. The digital optical instrument of claim 1, wherein:
said image sensor is fixed to part of the digital optical instrument which does not experience any tilting relative to the observed scene during an adjustment of the folding angle (α) of said hinge device;
a second bounding frame tilted by a second tilt angle (β2) is defined in said image recorded by said image sensor;
said second bounding frame delimits a second portion of said image recorded by said image sensor;
said second tilt angle (β2) of said second bounding frame is defined in dependence upon said folding angle (α) of said hinge device;
said first electronic display is configured to display said first portion delimited by said first bounding frame; and,
said second electronic display is configured to display said second portion delimited by said second bounding frame.

4. The digital optical instrument of claim 3, wherein said first tilt angle (β1) of said first bounding frame relative to said image sensor and said second tilt angle (β2) of said second bounding frame relative to said image sensor are defined mutually opposite.

5. The digital optical instrument of claim 3, wherein:
said hinge device includes a central pivot joint or mutually coupled first and second pivot joints about which said first eyepiece and said second eyepiece are pivoted in opposite directions;
said first pivot joint defines a first folding angle (α1) and said second pivot joint defines a second folding angle (α2);
said image sensor is attached to said hinge device in such a manner that said image sensor remains horizontal when said first folding angle (α1) is being adjusted during use of the digital optical instrument;
said first tilt angle (β1) of said first bounding frame relative to said image sensor and said second tilt angle (β2) of said second bounding frame relative to said image sensor are opposite but equal;
said first tilt angle (β1) of said first bounding frame relative to said image sensor corresponds to the tilt angle of the mechanical tilt of the first electronic display relative to said observed scene; and,
said second tilt angle (β2) of said second bounding frame relative to said image sensor corresponds to the tilt angle of the mechanical tilt of the second electronic display relative to said observed scene.

6. The digital optical instrument of claim 3, wherein:
said first and said second electronic displays extend parallel to the horizontal (H) at a reference folding angle (αR) and a differential folding angle (αR−α) is determined in relation to said reference folding angle (αR);
said first tilt angle (β1) of said first bounding frame relative to said image sensor is defined as a first half differential angle;
said second tilt angle (β2) of said second bounding frame relative to said image sensor is defined as a second half differential angle; and,
said first and said second half differential angles have opposite sense of rotation.

7. The digital optical instrument of claim 1, wherein at least one of said first and second eyepieces restricts the area of the corresponding one of said first and second electronic displays visible to the user by mechanical restrictions and substantially only pixels of the corresponding one of said first and second electronic displays, which lie within the visible area of the corresponding one of said first and second electronic displays, are actuated by image data of said image sensor.

8. The digital optical instrument of claim 1 further comprising:
a second bounding frame tilted by a second tilt angle (β2) is defined in said image recorded by said image sensor; and,
wherein the definition of at least one of said first tilt angle (β1) of said first bounding frame relative to said image sensor and said second tilt angle (β2) of said second bounding frame relative to said image sensor at the time of the later observation depends on the folding angle (α) of said hinge device which is set at the later observation.

9. The digital optical instrument of claim 1, wherein the digital optical instrument is embodied as digital binoculars.

10. A digital optical instrument comprising:
a folding bridge for adapting an interocular distance (D) to an interpupillary distance of a user having a first eye and a second eye;
a first eyepiece having a first electronic display for the first eye of the user;

a second eyepiece having a second electronic display for the second eye of the user;

said first and second eyepieces defining first and second optical axes (A1, A2), respectively, an image sensor configured to record an image;

an objective defining a third optical axis (A) and configured to image an observed scene containing an object onto said image sensor so as to define an image recorded thereby;

said first eyepiece and said second eyepiece conjointly defining the interocular distance (D);

said folding bridge having a hinge device defining a folding angle ($\alpha$) and pivotally interconnecting said first eyepiece and said second eyepiece so as to enable the interocular distance (D) to be adaptable to the individual interpupillary distance of the user via an adjustment of said folding angle ($\alpha$) of said hinge device;

said folding bridge being configured to mechanically tilt at least one of said first and said second electronic display relative to said image sensor about one of said first and second optical axes (A1, A2) parallel to said third optical axis (A);

a first bounding frame defined in said image and being tilted about a first tilt angle ($\beta$1) relative to said image sensor;

said first bounding frame delimiting a first portion of said image recorded by said image sensor;

said first tilt angle ($\beta$1) of said first bounding frame being defined in dependence upon said folding angle ($\alpha$) of said hinge device;

wherein an image of said object of said observed scene is transmitted to said first or second electronic display while maintaining the orientation relative to the observed scene and said image of said object, while maintaining the orientation of said image of said object relative to said observed scene, is displayed on corresponding ones of said first and second electronic displays, so that when said folding angle is adjusted, not the image of said object displayed on the corresponding ones of said first and second electronic displays is rotated, but rather, said image recorded by said image sensor is cut out obliquely and the orientation of said image of said object is maintained relative to the observed scene independently of the just adjusted folding angle from recordation by said image sensor to the display on the corresponding ones of said first and second electronic displays;

wherein said hinge device includes independent first and second pivot joints and a rigid central bridge part arranged between said first and said second pivot joints;

said first pivot joint is associated with said first eyepiece in a decentralized manner;

said second pivot joint is associated with said second eyepiece in a decentralized manner;

said first and said second eyepieces are configured to be pivotable relative to said rigid central bridge part independently of each other;

said image sensor is fixed to said rigid central bridge part;

said first pivot joint defines a first folding angle ($\alpha$1);

said second pivot joint defines a second folding angle ($\alpha$2);

said first tilt angle ($\beta$1) of said first bounding frame relative to said image sensor is defined depending on said folding angle ($\alpha$1) of said first pivot joint;

a second bounding frame tilted by a second tilt angle ($\beta$2) is defined in said image recorded by said image sensor; and, said second tilt angle ($\beta$2) of said second bounding frame relative to said image sensor is defined depending on said folding angle ($\alpha$2) of said second pivot joint.

11. A digital optical instrument comprising:

a folding bridge for adapting an interocular distance (D) to an interpupillary distance of a user having a first eye and a second eye;

a first eyepiece having a first electronic display for the first eye of the user;

a second eyepiece having a second electronic display for the second eye of the user;

said first and second eyepieces defining first and second optical axes (A1, A2), respectively, an image sensor configured to record an image;

an objective defining a third optical axis (A) and configured to image an observed scene containing an object onto said image sensor so as to define an image recorded thereby;

said first eyepiece and said second eyepiece conjointly defining the interocular distance (D);

said folding bridge having a hinge device defining a folding angle ($\alpha$) and pivotally interconnecting said first eyepiece and said second eyepiece so as to enable the interocular distance (D) to be adaptable to the individual interpupillary distance of the user via an adjustment of said folding angle ($\alpha$) of said hinge device;

said folding bridge being configured to mechanically tilt at least one of said first and said second electronic display relative to said image sensor about one of said first and second optical axes (A1, A2) parallel to said third optical axis (A);

a first bounding frame defined in said image and being tilted about a first tilt angle ($\beta$1) relative to said image sensor;

said first bounding frame delimiting a first portion of said image recorded by said image sensor;

said first tilt angle ($\beta$1) of said first bounding frame being defined in dependence upon said folding angle ($\alpha$) of said hinge device;

wherein an image of said object of said observed scene is transmitted to said first or second electronic display while maintaining the orientation relative to the observed scene and said image of said object, while maintaining the orientation of said image of said object relative to said observed scene, is displayed on corresponding ones of said first and second electronic displays, so that when said folding angle is adjusted, not the image of said object displayed on the corresponding ones of said first and second electronic displays is rotated, but rather, said image recorded by said image sensor is cut out obliquely and the orientation of said image of said object is maintained relative to the observed scene independently of the just adjusted folding angle from recordation by said image sensor to the display on the corresponding ones of said first and second electronic displays;

a housing;

said second electronic display and said image sensor being arranged in a common housing part of said housing, said common housing part being tilted mechanically relative to said observed scene about an axis parallel to said optical axis (A) by adjusting the folding angle ($\alpha$) of said hinge device such that said second electronic display and said image sensor are tilted together about the same angle (δ2) about an axis parallel to said optical axis (A) by adjusting the folding angle (α) of said hinge device;

a horizontally aligned intermediate bounding frame is defined in said image recorded by said image sensor;

said intermediate bounding frame bounds an intermediate portion of said image recorded by said image sensor;

a second bounding frame tilted by a second tilt angle (β2) is defined in said image recorded by said image sensor;

at least one of said first and said second bounding frames being defined in said intermediate bounding frame by at least one of said first and said second tilt angles (β1, β2) relative to said horizontally aligned intermediate bounding frame; and, at least one of said first and said second tilt angles (β1, β2) correspond to the mechanical tilt of at least one of said first and said second electronic displays.

12. A digital optical instrument comprising:

a folding bridge for adapting an interocular distance (D) to an interpupillary distance of a user having a first eye and a second eye;

a first eyepiece having a first electronic display for the first eye of the user;

a second eyepiece having a second electronic display for the second eye of the user;

said first and second eyepieces defining first and second optical axes (A1, A2), respectively, an image sensor configured to record an image;

an objective defining a third optical axis (A) and configured to image an observed scene containing an object onto said image sensor so as to define an image recorded thereby;

said first eyepiece and said second eyepiece conjointly defining the interocular distance (D);

said folding bridge having a hinge device defining a folding angle (α) and pivotally interconnecting said first eyepiece and said second eyepiece so as to enable the interocular distance (D) to be adaptable to the individual interpupillary distance of the user via an adjustment of said folding angle (α) of said hinge device;

said folding bridge being configured to mechanically tilt at least one of said first and said second electronic display relative to said image sensor about one of said first and second optical axes (A1, A2) parallel to said third optical axis (A);

a first bounding frame defined in said image and being tilted about a first tilt angle (β1) relative to said image sensor;

said first bounding frame delimiting a first portion of said image recorded by said image sensor;

said first tilt angle (β1) of said first bounding frame being defined in dependence upon said folding angle (α) of said hinge device;

wherein an image of said object of said observed scene is transmitted to said first or second electronic display while maintaining the orientation relative to the observed scene and said image of said object, while maintaining the orientation of said image of said object relative to said observed scene, is displayed on corresponding ones of said first and second electronic displays, so that when said folding angle is adjusted, not the image of said object displayed on the corresponding ones of said first and second electronic displays is rotated, but rather, said image recorded by said image sensor is cut out obliquely and the orientation of said image of said object is maintained relative to the observed scene independently of the just adjusted folding angle from recordation by said image sensor to the display on the corresponding ones of said first and second electronic displays;

a housing;

said second electronic display and said image sensor being arranged in a common housing part of said housing, said common housing part being tilted mechanically relative to said observed scene about an axis parallel to said optical axis (A) by adjusting said folding angle (α) of said hinge device such that said second electronic display and said image sensor are tilted together about the same angle about said axis parallel to said optical axis (A) by adjusting said folding angle (α) of said hinge device;

an intermediate bounding frame is defined for each folding angle (α) parallel to a horizontal (H) such that an intermediate portion bounded by said intermediate bounding frame which is tilted relative to said image sensor is parallel to the horizontal (H);

a third bounding frame without a tilt relative to said image sensor is defined in said image recorded by said image sensor;

said third bounding frame bounding a third portion, parallel to said image sensor, of said image recorded by said image sensor;

said first bounding frame which is tilted relative to said intermediate portion being defined in said intermediate portion lying parallel to the horizontal (H);

said first bounding frame bounding said first portion and the tilt of which in relation to the observed scene corresponding to the mechanical tilt of said first display; and, said first portion being transmitted to said first electronic display and displayed by said first electronic display and said third portion, without a tilt relative to said image sensor, of said image recorded by said image sensor being transmitted to said second display and displayed by said second display.

13. A digital optical instrument comprising:

a folding bridge for adapting an interocular distance (D) to an interpupillary distance of a user having a first eye and a second eye;

a first eyepiece having a first electronic display for the first eye of the user;

a second eyepiece having a second electronic display for the second eye of the user;

said first and second eyepieces defining first and second optical axes (A1, A2), respectively, an image sensor configured to record an image;

an objective defining a third optical axis (A) and configured to image an observed scene containing an object onto said image sensor so as to define an image recorded thereby;

said first eyepiece and said second eyepiece conjointly defining the interocular distance (D);

said folding bridge having a hinge device defining a folding angle (α) and pivotally interconnecting said first eyepiece and said second eyepiece so as to enable the interocular distance (D) to be adaptable to the individual interpupillary distance of the user via an adjustment of said folding angle (α) of said hinge device;

said folding bridge being configured to mechanically tilt at least one of said first and said second electronic display relative to said image sensor about one of said first and second optical axes (A1, A2) parallel to said third optical axis (A);

a first bounding frame defined in said image and being tilted about a first tilt angle (β1) relative to said image sensor;

said first bounding frame delimiting a first portion of said image recorded by said image sensor;

said first tilt angle (β1) of said first bounding frame being defined in dependence upon said folding angle (α) of said hinge device;

wherein an image of said object of said observed scene is transmitted to said first or second electronic display while maintaining the orientation relative to the observed scene and said image of said object, while maintaining the orientation of said image of said object relative to said observed scene, is displayed on corresponding ones of said first and second electronic displays, so that when said folding angle is adjusted, not the image of said object displayed on the corresponding ones of said first and second electronic displays is rotated, but rather, said image recorded by said image sensor is cut out obliquely and the orientation of said image of said object is maintained relative to the observed scene independently of the just adjusted folding angle from recordation by said image sensor to the display on the corresponding ones of said first and second electronic displays;

a housing;

said second electronic display and said image sensor being arranged in a common housing part of said housing, the common housing part being tilted mechanically relative to said observed scene about an axis parallel to said optical axis (A) by adjusting the folding angle (α) of said hinge device such that said second electronic display and said image sensor are tilted together about the same angle about the axis parallel to said optical axis (A) by adjusting said folding angle (α) of said hinge device;

said first and the second electronic display extending parallel to the horizontal at a reference folding angle (αR) and a differential folding angle (αR−α) being determined in relation to said reference folding angle (αR);

said first tilt angle (β1) of said first bounding frame being defined to be as large as said differential folding angle (αR−α);

a third bounding frame without a tilt relative to said image sensor being defined in said image recorded by said image sensor;

said third bounding frame bounding a third portion, without a tilt relative to said image sensor, of said image recorded by said image sensor; and, said first portion, which is bounded by said tilted first bounding frame, of said image recorded by said image sensor is transmitted to said first display and displayed by said first display and said third portion, without a tilt relative to said image sensor, of said image recorded by said image sensor is transmitted to said second electronic display and displayed by said second electronic display.

14. A digital optical instrument comprising:
a folding bridge for adapting an interocular distance (D) to an interpupillary distance of a user having a first eye and a second eye;
a first eyepiece having a first electronic display for the first eye of the user;
a second eyepiece having a second electronic display for the second eye of the user;
said first and second eyepieces defining first and second optical axes (A1, A2), respectively,
an image sensor configured to record an image;
an objective defining a third optical axis (A) and configured to image an observed scene containing an object onto said image sensor so as to define an image recorded thereby;
said first eyepiece and said second eyepiece conjointly defining the interocular distance (D);
said folding bridge having a hinge device defining a folding angle (α) and pivotally interconnecting said first eyepiece and said second eyepiece so as to enable the interocular distance (D) to be adaptable to the individual interpupillary distance of the user via an adjustment of said folding angle (α) of said hinge device;
said folding bridge being configured to mechanically tilt at least one of said first and said second electronic display relative to said image sensor about one of said first and second optical axes (A1, A2) parallel to said third optical axis (A);
a first bounding frame defined in said image and being tilted about a first tilt angle (β1) relative to said image sensor;
said first bounding frame delimiting a first portion of said image recorded by said image sensor;
said first tilt angle (β1) of said first bounding frame being defined in dependence upon said folding angle (α) of said hinge device;
wherein an image of said object of said observed scene is transmitted to said first or second electronic display while maintaining the orientation relative to the observed scene and said image of said object, while maintaining the orientation of said image of said object relative to said observed scene, is displayed on corresponding ones of said first and second electronic displays, so that when said folding angle is adjusted, not the image of said object displayed on the corresponding ones of said first and second electronic displays is rotated, but rather, said image recorded by said image sensor is cut out obliquely and the orientation of said image of said object is maintained relative to the observed scene independently of the just adjusted folding angle from recordation by said image sensor to the display on the corresponding ones of said first and second electronic displays; and,
wherein at least one of said first and said second eyepieces restricts the area of the corresponding one of said first and second electronic displays visible to the user by mechanical restrictions and, wherein the respective display is not greater than the visible area, at least in one dimension.

15. The digital optical instrument of claim 14, wherein at least one of said first and said second electronic displays has a rectangular, non-square or square form and the visible area of the corresponding one of said first and second displays is round and, wherein the diameter of the round visible area at least completely covers the respective display in one dimension.

16. A digital optical instrument comprising:
a folding bridge for adapting an interocular distance (D) to an interpupillary distance of a user having a first eye and a second eye;
a first eyepiece having a first electronic display for the first eye of the user;

a second eyepiece having a second electronic display for the second eye of the user;

said first and second eyepieces defining first and second optical axes (A1, A2), respectively, an image sensor configured to record an image;

an objective defining a third optical axis (A) and configured to image an observed scene containing an object onto said image sensor so as to define an image recorded thereby;

said first eyepiece and said second eyepiece conjointly defining the interocular distance (D);

said folding bridge having a hinge device defining a folding angle (α) and pivotally interconnecting said first eyepiece and said second eyepiece so as to enable the interocular distance (D) to be adaptable to the individual interpupillary distance of the user via an adjustment of said folding angle (α) of said hinge device;

said folding bridge being configured to mechanically tilt at least one of said first and said second electronic display relative to said image sensor about one of said first and second optical axes (A1, A2) parallel to said third optical axis (A);

a first bounding frame defined in said image and being tilted about a first tilt angle (β1) relative to said image sensor;

said first bounding frame delimiting a first portion of said image recorded by said image sensor;

said first tilt angle (β1) of said first bounding frame being defined in dependence upon said folding angle (α) of said hinge device;

wherein an image of said object of said observed scene is transmitted to said first or second electronic display while maintaining the orientation relative to the observed scene and said image of said object, while maintaining the orientation of said image of said object relative to said observed scene, is displayed on corresponding ones of said first and second electronic displays, so that when said folding angle is adjusted, not the image of said object displayed on the corresponding ones of said first and second electronic displays is rotated, but rather, said image recorded by said image sensor is cut out obliquely and the orientation of said image of said object is maintained relative to the observed scene independently of the just adjusted folding angle from recordation by said image sensor to the display on the corresponding ones of said first and second electronic displays;

wherein said hinge device includes a first and a second pivot joint, the digital optical instrument further comprising:

a second bounding frame tilted by a second tilt angle (β2) is defined in said image recorded by said image sensor;

at least one folding bridge sensor via which the folding angle of at least one of said first and said second pivot joints is measured, wherein at least one of said first tilt angle (β1) of said first bounding frame relative to said image sensor and said second tilt angle (β2) of the second bounding frame relative to the image sensor is defined automatically in response to the folding angle, which is measured by said at least one folding bridge sensor, of at least one pivot joint; or, the optical instrument having a setting device via which the user can define at least one of said first tilt angle (β1) of the first bounding frame relative to said image sensor and said second tilt angle (β2) of said second bounding frame relative to said image sensor manually.

* * * * *

UNITED STATES PATENT AND TRADEMARK OFFICE
CERTIFICATE OF CORRECTION

PATENT NO. : 9,691,154 B2
APPLICATION NO. : 14/757442
DATED : June 27, 2017
INVENTOR(S) : Ernst et al.

Page 1 of 1

It is certified that error appears in the above-identified patent and that said Letters Patent is hereby corrected as shown below:

In Column 16:
Line 35: delete "δ2" and substitute -- β2 -- therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*